(12) United States Patent
Froggatt et al.

(10) Patent No.: US 7,388,673 B2
(45) Date of Patent: Jun. 17, 2008

(54) HETERODYNE OPTICAL SPECTRUM ANALYZER

(75) Inventors: Mark E Froggatt, Blacksburg, VA (US); Brian J Soller, Blacksburg, VA (US); Matthew S Wolfe, Christiansburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 375 days.

(21) Appl. No.: 10/520,818

(22) PCT Filed: Jul. 8, 2003

(86) PCT No.: PCT/US03/21337

§ 371 (c)(1),
(2), (4) Date: Jul. 25, 2005

(87) PCT Pub. No.: WO2004/005974

PCT Pub. Date: Jan. 15, 2004

(65) Prior Publication Data

US 2006/0033927 A1 Feb. 16, 2006

Related U.S. Application Data

(60) Provisional application No. 60/394,261, filed on Jul. 9, 2002.

(51) Int. Cl.
*G01B 11/02* (2006.01)
*G01B 9/02* (2006.01)
*G01J 3/45* (2006.01)

(52) U.S. Cl. ............... 356/484; 356/491; 356/451
(58) Field of Classification Search ............... 356/484, 356/491, 451, 453
See application file for complete search history.

(56) References Cited

U.S. PATENT DOCUMENTS

| | | | |
|---|---|---|---|
| 4,817,101 A * | 3/1989 | Wyeth et al. | 356/451 |
| 5,943,132 A * | 8/1999 | Erskine | 356/484 |
| 6,462,827 B1 * | 10/2002 | Frankel | 356/491 |
| 6,587,214 B1 | 7/2003 | Munks | |
| 7,019,839 B2 * | 3/2006 | Szafraniec | 356/484 |
| 7,068,374 B2 * | 6/2006 | Gurunathan et al. | 356/484 |
| 2003/0133122 A1 * | 7/2003 | Szafraniec et al. | 356/477 |
| 2004/0114939 A1 * | 6/2004 | Taylor | 398/152 |
| 2004/0246491 A1 * | 12/2004 | Gurunathan et al. | 356/484 |
| 2004/0246492 A1 * | 12/2004 | McAlexander | 356/484 |
| 2005/0012934 A1 * | 1/2005 | Szafraniec | 356/484 |
| 2005/0078317 A1 * | 4/2005 | Law et al. | 356/484 |
| 2006/0012797 A1 * | 1/2006 | Chang et al. | 356/484 |
| 2006/0061770 A1 * | 3/2006 | Erskine | 356/484 |

OTHER PUBLICATIONS

International Search Report, Mar. 4, 2004.

\* cited by examiner

*Primary Examiner*—Patrick J Connolly
(74) *Attorney, Agent, or Firm*—Nixon & Vanderhye P.C.

(57) ABSTRACT

A heterodyne optical signal analyzer (HOSA) permits accurate reconstruction of an optical input signal (Es) in the time domain. In one embodiment, a vector representation of the light is used to account for two polarization states of the optical signal. The components of a heterodyne optical signal analyzer (10), including optical couplers (12), all have errors and offsets. For example, optical power detectors (16) are very sensitive to changes in polarization of the optical signal (Es) and of the reference signal (Er). Several HOSA calibration procedures including detector calibration, vector calibration, and reference signal calibration are described.

47 Claims, 12 Drawing Sheets

Output at Detector Block 1 $(\bar{E}_s \cdot \bar{E}_{r,p1})$

Output at Detector Block 2 $(\bar{E}_s \cdot \bar{E}_{r,p2})$

HETERODYNE OPTICAL SPECTRUM ANALYZER

CLAIM OF BENEFIT OF PROVISIONAL PATENT APPLICATION

Priority is claimed from provisional application No. 60/394,261 filed on Jul. 9, 2002. The provisional application is incorporated by reference.

This application is the US national phase of international application PCT/US2003/021337 filed 8 Jul. 2003, the entire content of which is hereby incorporated by reference.

RELATED APPLICATIONS

This application is related to commonly-assigned application Ser. No. 10/520,819, entitled "Polarization Diversity Detection Without a Polarizing Beam Splitter," filed on Jul. 26, 2005.

FIELD OF THE INVENTION

The present invention relates to optical measurements, and more particularly, to a method and system for optical spectrum analysis utilizing optical heterodyne detection.

BACKGROUND AND SUMMARY OF THE INVENTION

Optical heterodyne systems analyze the optical spectrum of an input optical signal under test. A basic optical heterodyne detection system includes an optical coupler that combines an input optical signal from a fiber or device under test with a reference optical signal. The resulting "mixed" optical signal includes a heterodyne "beat" signal at a frequency equal to the frequency difference between the input optical signal and the reference optical signal. The reference signal frequency is changed or "swept" across the bandwidth of the input signal. The detected beat signals over that swept bandwidth are processed to determine one or more characteristics of the input optical signal such as frequency, wavelength, or amplitude.

Typically, heterodyned spectrum analyzers detect amplitude spectra at high resolution compared with other forms of spectrum analyzers. This difference in resolution can be as large as four orders of magnitude. Unfortunately, the local tunable laser source for heterodyned spectrum analyzers is very expensive, and the need for very fine accuracy of the instruments is not clearly shown. As a result, there are very few heterodyned spectrum analyzers on the market.

A problem with conventional optical spectrum analyzers is they only provide amplitude information about the input optical signal's frequency spectrum—phase information is not obtained. But absent that phase information, the input optical signal cannot be accurately reconstructed in the time domain. Indeed, two different signals may have the same amplitude spectrum but different phases. In this situation, a detected amplitude spectrum, by itself, cannot be resolved accurately into one of those two signals.

This difficulty is illustrated in FIGS. 1-5. FIG. 1 shows a binary sequence corresponding to an original time varying signal. The vertical axis is labeled the modulating signal and is graphed against time on the horizontal axis. The original time varying signal modulates an optical "carrier" resulting in a modulated optical signal, which when transmitted over a fiber, may be detected as a frequency spectrum as shown in FIG. 2. One might assume that the original signal could be simply recovered by transforming the frequency spectrum into the time demand, i.e., by applying an inverse Fourier transform to the detected signal. But this assumption is not true. The detected spectrum includes only the amplitude of the signal; the phase is missing. The original time-domain signal cannot be recovered in the inverse Fourier transform operation because the phase information has been lost. The resulting time domain waveform in FIG. 3 resulting from the transform is distorted beyond recognition from what is shown in FIG. 1. Indeed, it is compressed into a single pulse rather than the series of pulses shown in FIG. 1.

If both the phase information as well as the amplitude information can be determined from the frequency spectrum shown in FIG. 2, both the real and imaginary parts of the spectrum could be determined as shown in FIG. 4. Transforming the frequency spectrum of the signal that contains both real and imaginary parts, (both amplitude and phase information), permits recovery of the original information as shown in FIG. 5 which corresponds to the modulating signal information shown in FIG. 1.

An objective of the present invention is to detect an optical signal's complex power spectrum, such as that shown in FIG. 4, and to determine from that detected spectrum both amplitude and phase so that an original information signal can be reconstructed accurately in the time domain. A heterodyne optical signal analyzer in accordance with the present invention performs such a signal reconstruction to accurately recover the full, complex (amplitude and phase) time domain signal as well as the spectrum, thus providing an instrument with greater utility.

All laser transmitters introduce an unwanted phase shift on the optical signal. This unwanted phase shift, referred to as "chirp," limits the distance over which the optical signal can be sent. The present invention enables precise characterization of the signal chirp permitting accurate prediction of the transmission distance limit, and even how to modify the transmitted optical signal so that longer transmission distances can be achieved.

In addition to resolving both the phase and amplitude of an optical signal as a function of time and chirp characterization, the performance of the heterodyne optical signal analyzer in accordance with the present invention is not limited by the bandwidth of its components. For example, a 40 GHz optical input signal can be accurately processed even though the heterodyne optical signal analyzer operates at a much lower frequency. The heterodyne optical signal analyzer slowly builds a picture of the input signal by sweeping the reference signal below and above the frequency of the input signal to be reconstructed. As a result, signals may be reconstructed with very high resolution. Effective sampling rates as high as 1000 GHz may be achieved. The measurements produced at these rates do not have any detector bandwidths incorporated into them, and thus the signals are nearly free of distortion.

Accordingly, the heterodyne optical signal analyzer in accordance with the present invention permits optical communication system designers to determine in advance what an optical signal will look like when it is transmitted over a fiber network. That information is extremely important to people who design such networks. Currently, no instrument is available that permits one to identify the optical signal being propagated at any point in the network. In other words, the transmitted signal is an unknown. Although the signal's power as a function of time and the amount of chirp (variation in frequency as the power is turned on and off) can be measured, how the amplitude and phase of the signal vary with time is unavailable. Until now, there is no reliable way to predict how a particular transmitter will interact with a specific set of optical components or an overall optical link. Knowing the precise nature of the signals present in a network is the first step in making the network cheaper and more efficient. With conventional optical signal analysis instrumentation, there is a great deal of interpretation and guess-work involved leaving simple analysis problems to highly skilled and expensive people. The invention reduces the problem of analyzing an optical network to an analysis closer to that employed for existing cable or microwave networks.

Other aspects of the present invention relate to calibrating the heterodyne optical signal analyzer. Light in a standard optical fiber includes two orthogonal polarization modes. To fully characterize the light in the heterodyne optical signal analyzer, a vector representation of the light requires determining amplitude and phase for each of the two orthogonal modes. The components of a heterodyne optical signal analyzer, including optical couplers, detector blocks that detect optical power and convert it into an electrical signal, and the reference signal generator, all have errors and offsets. For example, optical power detectors are very sensitive to changes in polarization of the optical input signal and the reference optical signal. Several different calibration procedures, including detector calibration, vector calibration, and reference signal calibration are described below.

In a general example embodiment of the invention, an optical signal analyzer includes a first coupler, a first detector block, and a data processor. The first coupler mixes an optical reference signal and an optical input signal whose characteristics are to be determined and generates multiple mixed signal outputs. The first detector block detects multiple power signals from the multiple mixed signals. Each individual detector in the detector block includes in one example implementation a photodetector, an amplifier, an analog-to-digital converter for converting the amplified output into digital power signal information, and a buffer for storing the digital power signal information.

The data processor determines the original optical input signal in the time domain from those multiple detected power signals. Both the amplitude and the phase of the optical input signal are determined from the detected multiple power signals for each different frequency of the reference signal as it is swept across the frequency bandwidth of the input signal. From these detected outputs over the swept frequency range, the original time domain signal is reconstructed using signal processing procedures outlined below.

In the first example embodiment, the first coupler generates first, second, and third mixed signals, and the first detector block detects corresponding first, second, and third power signals. But in a second example embodiment, a second coupler and a second detector block are added to take into account the two polarizations of light, thereby permitting more accurate signal reconstruction. The first coupler and detector detect mixed signals where the reference signal has a first polarization. The second coupler and detector detect mixed light where the reference signal has a second different polarization. The second coupler generates fourth, fifth and sixth mixed signals, and the second detector detects fourth, fifth and sixth power signals from the fourth, fifth and sixth mixed signals.

In the second example embodiment, the data processor determines a first phasor of the optical input signal using the first, second, and third detected powers and a second phasor of the optical input signal using the fourth, fifth, and sixth detected powers. Using the first and second phasors, the data processor determines the input optical signal in the time domain. In effect, the data processing circuitry determines from the first, second, and third detected powers a first real part and a first imaginary part of the input optical signal in a first complex reference plane. Similarly, from the fourth, fifth, and sixth detected powers, the data processing circuitry determines a second real part and a second imaginary part of the input optical signal in a second complex reference plane. The first complex reference plane corresponds to the first polarization state of the optical reference signal, and the second complex reference plane corresponds to the second polarization state of the optical reference signal. The first real part and the first imaginary part correspond to the first phasor, and the second real part and the second imaginary part correspond to the second phasor.

Together, the first and second phasors accurately represent all the polarization states of the input optical signal and include both the real and imaginary signal components in both polarization states. As a result, the input signal can be reconstructed very accurately in the time domain (more so than when only one phasor is employed).

Although the present invention can be practiced without calibration, better results are achieved when calibration is employed. Typically, optical components will have tolerances that are no better than 5% or 10%. Therefore, if the system is constructed from commonly available optical components, resulting measurements are accurate to this same degree. But higher degrees of accuracy are required. One method of achieving this would be to buy increasingly better optical components, but this approach rapidly becomes cost prohibitive. A better way is to accurately calibrate their unwanted effects on the measured signals, and then computationally remove them from the measurements. In this way, higher accuracy measurements can be achieved at a much lower cost. In fact, the accuracies that can be achieved with this approach may exceed the accuracies that could be achieved regardless of optical component cost.

In a first example calibration, amplitude and phase corrections for the phasor output by the first detector block may be determined and used to generate a phasor calibration matrix for the first detector block. As the reference signal is swept across a range of different frequencies, corresponding detected powers at the first detector block are acquired for each frequency. Each detected power has a high frequency component. Phase differences are calculated between the detected powers in the first detector block using the corresponding acquired high frequency components. The reference signal may again be swept across the range of different wavelengths without an input signal to acquire detected powers in the first detector block. Each detected power has a low frequency component. Amplitude differences between detectors in the first detector block are calculated using the corresponding acquired low frequency components. These phase and amplitude differences are used to generate the phasor calibration matrix. Preferably, the phasor calibration matrix is converted from an arbitrary reference system into complex plane reference system. A similar calibration procedure may be applied to the second detector block in the second example embodiment.

A vector calibration procedure is also desirable in the context of the second example embodiment described above. Accurate vector measurements require that the signal be projected onto two orthogonal vectors with the same length. The measurement is accurate only to the degree that these conditions are satisfied. If those conditions are not satisfied, which they typically are not in a real world system, the system should be calibrated for the non-ideal aspects of the reference vectors. Because optical polarization states within fiber optic networks tend to vary over wavelength, (e.g., as the laser source is tuned), keeping the two reference states perfectly orthogonal is very difficult and expensive. If, however, the two states need only be approximately orthogonal, but repeatable, then the system is much easier to build and only requires a calibration procedure to produce the correct vector measurements.

In the vector calibration procedure, the reference signal is generated at multiple different polarizations, (e.g., four), and the resulting power phasors determined at the first and second detector blocks construct a complex vector corresponding to each different reference signal polarization. A vector calibration matrix is generated using the complex vectors generated for each of the reference signal polarizations. The vector calibration matrix is used in normal operation to convert subsequently detected powers at the first and second detector blocks into an ortho-normal coordinate system.

It is further desirable to calibrate a reference signal generator to ensure that the frequency of the generated reference signal matches the frequency the generator is set to generate. In the frequency calibration procedure, the reference signal is swept across a range of different frequencies. A portion of the reference signal is passed through two different length fiber paths. Light from the two different length paths is detected as a function of wavelength. A reference signal frequency correction is determined using those detected outputs.

A final procedure relates to the recovery of the complex spectrum of the input optical signal. This signal recovery requires the spectrum of the signal to remain constant over the course of the measurement, which is not difficult if the signal is repetitive with some period that is known or can be measured. The processes and calibrations described above allow measurement of the time variation of a complex vector with respect to a known reference field. This raw signal is only a part of the overall signal which may have a bandwidth much larger than the bandwidth of the detector. By observing the signal over a series of bands that completely covers the signal bandwidth, the signal can be reconstructed entirely at a much higher effective sampling rate than would otherwise be possible. The effective sampling rate is determined by the sweep range of the reference laser, and can be on the order of 1000 GHz.

A frequency bandwidth response for each detector block is determined. From the corresponding frequency response, a time domain impulse response of each detector block is determined. The impulse response is used to create a Green's function that relates the input optical signal to be determined as a function of time and the measured signal determined from the detected power as a function of time. The Green's function is inverted and then used to convert the measured signal into the input optical signal.

Other features, aspects, and advantages of the present invention will become apparent from the following detailed description, taken in conjunction with the accompanying drawings, illustrating by way of example the principles of the invention. Like reference numerals refer to like elements throughout.

DETAILED DESCRIPTION

The following description, for purposes of explanation not limitation, sets forth specific details, such as particular components, electronic circuitry, techniques, etc. in order to provide an understanding of the present invention. But it will be apparent to one skilled in the art that the present invention may be practiced in other embodiments that depart from these specific details. In other instances, detailed descriptions of well-known methods, devices, and techniques, etc. are omitted so as not to obscure the invention with unnecessary detail. Individual function blocks are shown in the Figures. Those skilled in the art will appreciate that functions may be implemented using discrete components or multi-function hardware. Processing functions may be implemented using a suitably programmed microprocessor or general purpose computer, using an application specific integrated circuit (ASIC), and/or using one or more digital signal processors (DSPs).

Figure 1:
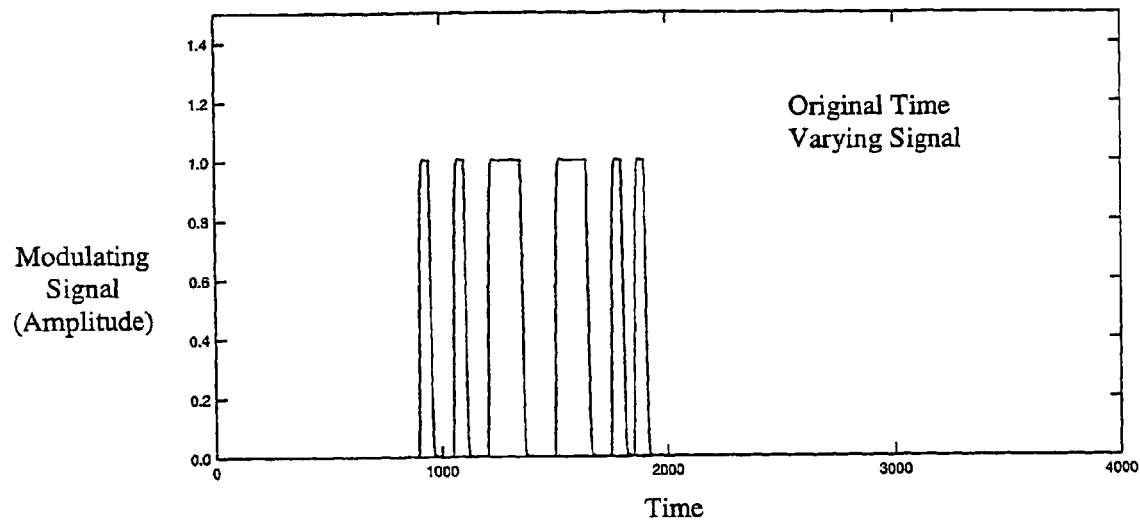
FIG. 1 is a graph illustrating an original modulating signal in the time domain.
Figure 2:
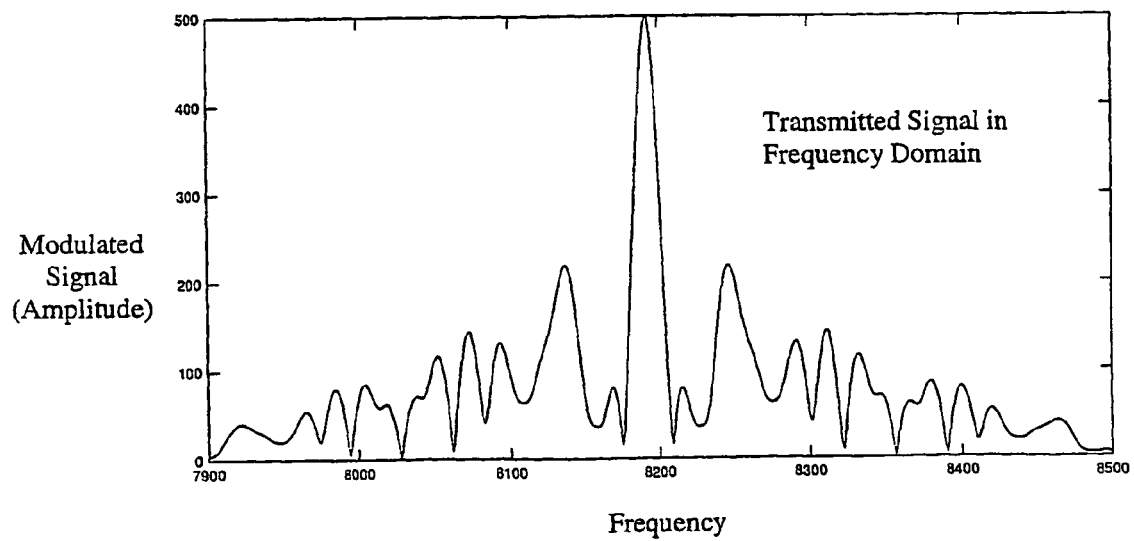
FIG. 2 is a graph illustrating an optical signal modulated with the information from FIG. 1 in the frequency domain showing just the real part of the frequency spectrum.
Figure 3:
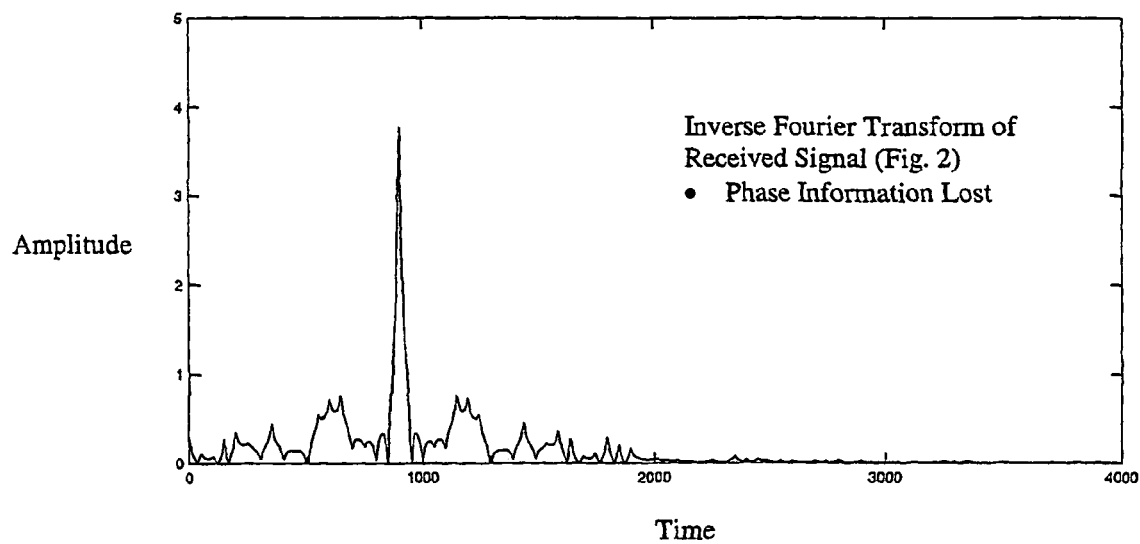
FIG. 3 is a graph illustrating a transform of the frequency domain signal in FIG. 2 into the time domain.
Figure 4:
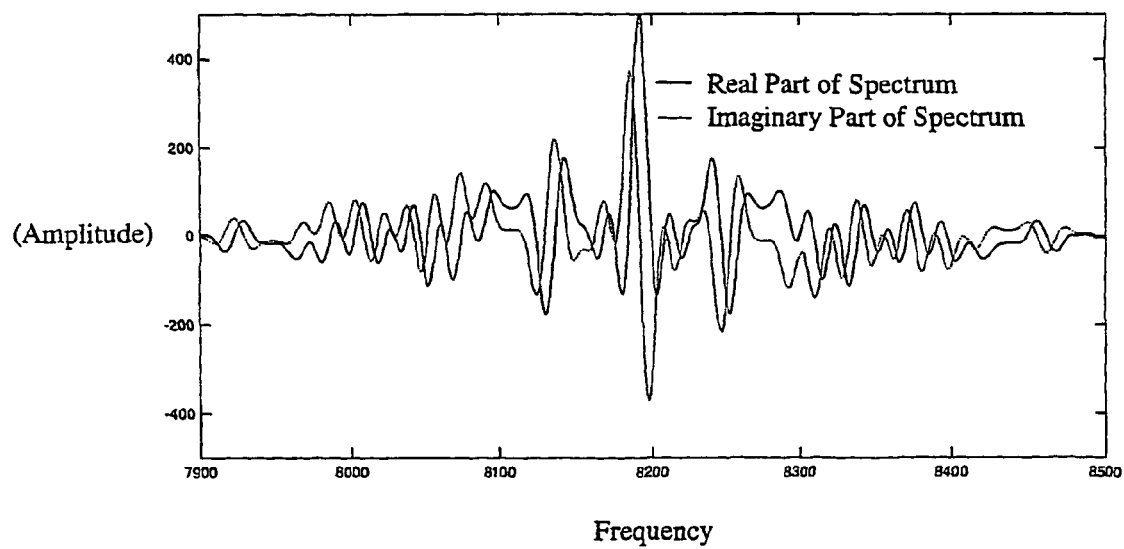
FIG. 4 is a graph illustrating the modulated optical signal in the frequency domain that includes both the real and imaginary parts of the frequency spectrum.
Figure 5:
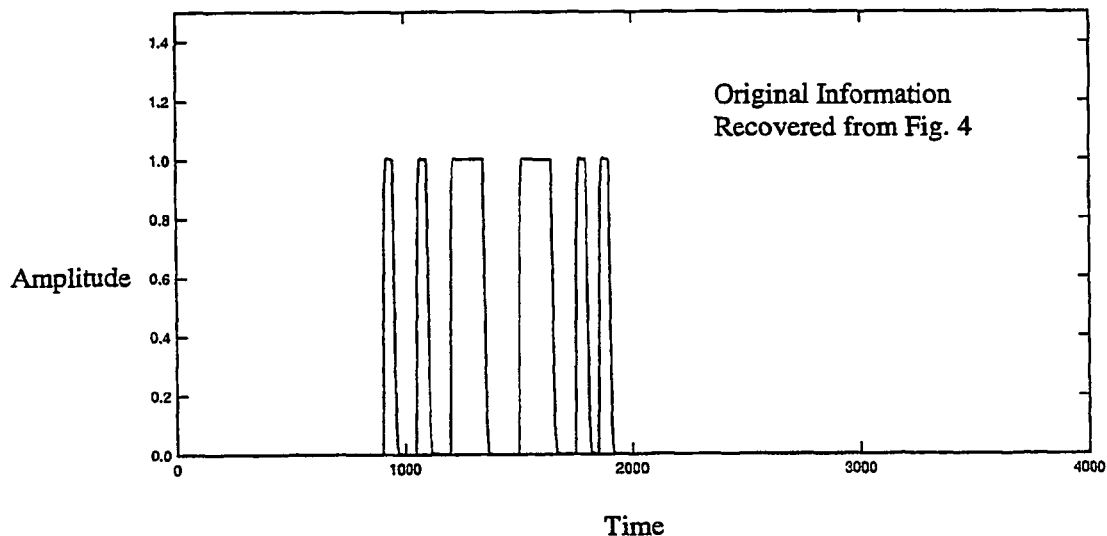
FIG. 5 is a graph illustrating the original information recovered by inverse Fourier transform from the complex frequency spectrum shown in FIG. 4.
Figure 6:
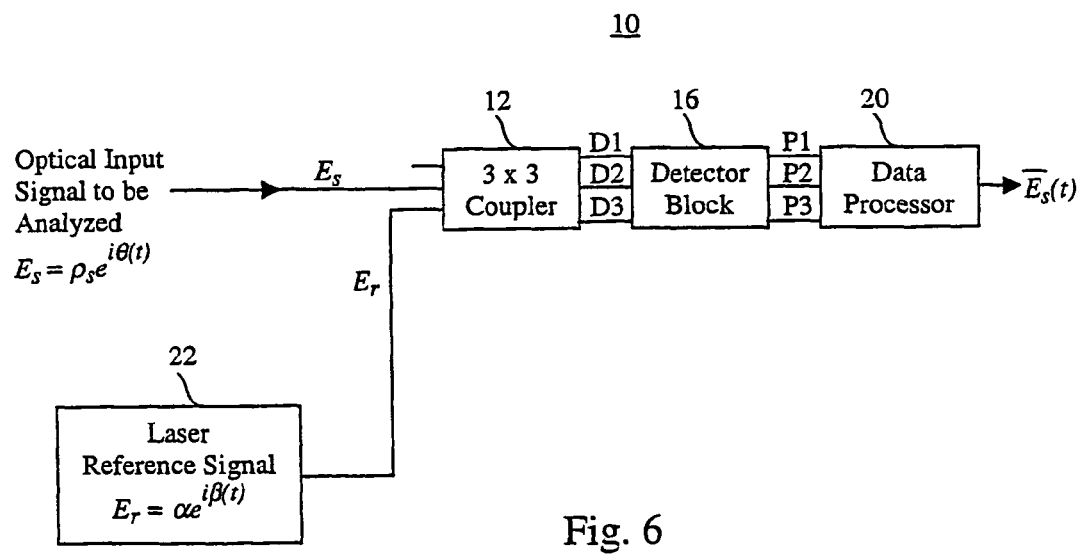
FIG. 6 is a depiction of a heterodyne-based optical spectrum analyzer (HOSA) in accordance with one example embodiment of the present invention.

A first example embodiment is described in conjunction with the heterodyne-based optical signal analyzer (HOSA) 10 depicted in FIG. 6. The optical input signal to be analyzed $E_s = \rho_s e^{i\Theta(t)}$ (hereafter sometimes referred to simply as $E_s$) is provided to an optical coupler, which in this embodiment may be a 3×3 coupler 12. Any coupler may be employed, and one non-limiting example is Gould part no. 23-40355-33-01201 manufactured by Gould Fiber Optics Division of Gould Electronics of Baltimore, Md. A laser reference signal $E_r = \alpha e^{i\beta(t)}$ (hereafter sometimes referred to simply as $E_r$) is provided to another input terminal of the 3×3 coupler 12. The two signals $E_s$ and $E_r$ are mixed in the coupler 12 which provides three interference output signals D1, D2, and D3. The interference signals D1, D2, and D3 are provided to an optical detector block 16 which detects the corresponding power level of each of the detected signals D1, D2 and D3 and generates three corresponding digital power signals P1, P2, and P3. The detector block 16 may be any suitable detector block, and one non-limiting example is a Thorlabs PDA 400 optical detector manufactured by Thorlabs of Newton, N.J. The digital signals P1, P2 and P3 are processed by a data processor 20 to calculate the original optical signal to be analyzed in the time domain $E_s(t)$.

Figure 7:
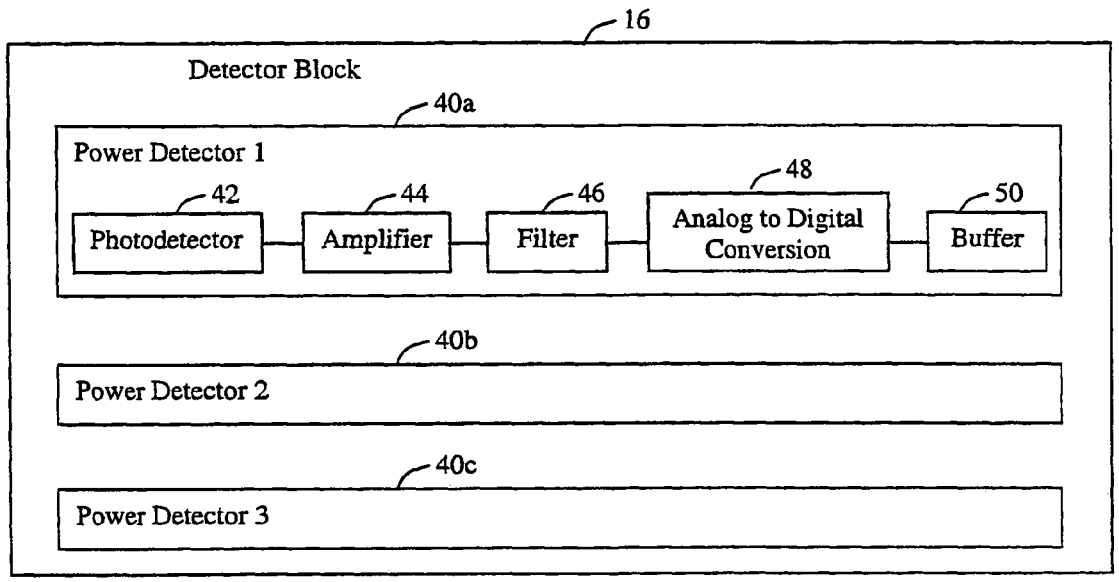
FIG. 7 is a depiction of the detector block shown in FIG. 6.

FIG. 7 shows an example of the detector block 16 which includes three power detectors 40a, 40b, and 40c. Each power detector 40a, 40b, and 40c includes a photodetector 42, coupled to an amplifier 44, coupled to a low-pass filter 46. The filtered output is converted into a digital format by digital-to-analog conversion means 48, and the digital signal is stored in the buffer 50 before being processed by the data processor 20.

Figure 8:
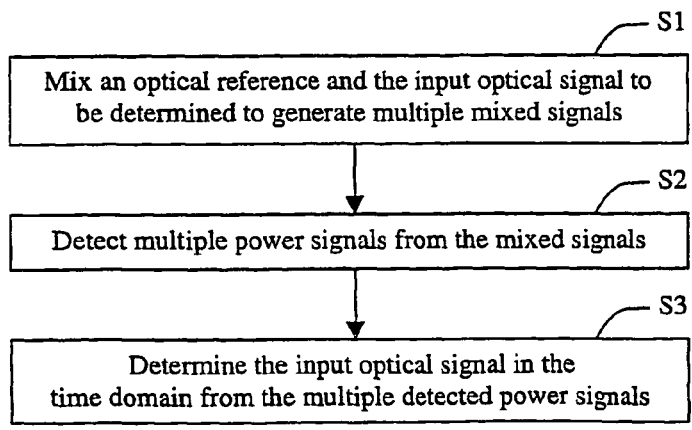
FIG. 8 is a flowchart diagram illustrating example procedures in accordance with the HOSA illustrated in FIG. 6.

FIG. 8 is a flowchart diagram illustrating the basic steps for determining the input optical signal in the time domain. An optical reference signal and the input optical signal to be determined are mixed to generate multiple mixed signals (step S1). Multiple power signals are detected from the mixed signals (step S2). The input optical signal is determined in the time domain from the multiple detected power signals (step S3). The mathematical procedures implemented by the data processor 20 to determine the input optical signal from the multiple detected power will now be described.

Given two optical signals incident on a 3×3 detector, where the two fields are given by, $$E_r = \alpha e^{i\beta} \quad (1)$$

and $$E_s = \rho_s e^{i\theta} \quad (2)$$

the three detected powers will be, $$P_1 = \alpha^2 + \rho_s^2 + 2\alpha\rho_s \cos[\beta - \theta + \phi_1] \quad (3)$$

$$P_2 = \alpha^2 + \rho_s^2 + 2\alpha\rho_s \cos[\beta - \theta + \phi_2] \quad (4)$$

$$P_3 = \alpha^2 + \rho_s^2 + 2\alpha\rho_s \cos[\beta - \theta + \phi_3] \quad (5)$$

where $\alpha$ is the amplitude of $E_r$, $\beta$ is the phase of $E_r$, $\rho$ is the amplitude of $E_s$, $\theta$ is the phase of $E_s$, and $\phi_1$, $\phi_2$, and $\phi_3$ are phase shifts detected in the 3×3 coupler 12. These phase shifts can be derived using conservation of energy and are found to be $$\frac{2\pi}{3}$$

for a 3×3 coupler. In other words, $\phi_1$, $\phi_2$, and $\phi_3$ are approximately and respectively 0°, 120°, and 240°.

The signal that we wish to recover is $$E_s = \rho_s e^{i(\beta - \theta)} = \rho_s \cos(\beta - \theta) + \rho_s \sin(\beta - \theta).$$

If we can know $\theta$, the phase of the reference signal $E_r$, the original signal's electric field $E_s$ can be reconstructed as follows.

We begin by subtracting $P_3$ from $P_1$ and $P_2$, $$P_1 - P_3 = 2\alpha\rho_s \cos[\beta - \theta + \phi_1] - 2\alpha\rho_s \cos[\beta - \theta + \phi_3] \quad (6)$$

$$P_2 - P_3 = 2\alpha\rho_s \cos[\beta - \theta + \phi_2] - 2\alpha\rho_s \cos[\beta - \theta + \phi_3] \quad (7)$$

We then divide through by $\alpha$, (measured previously so it is known), and expand the cosines of angle sums into products of sines and cosines.

$$\frac{P_1 - P_3}{2\alpha} = \rho_s \cos(\beta - \theta)\cos(\varphi_1) - \rho_s \sin(\beta - \theta)\sin(\varphi_1) - \rho_s \cos(\beta - \theta)\cos(\varphi_3) + \rho_s \sin(\beta - \theta)\sin(\varphi_3) \quad (8)$$

$$\frac{P_2 - P_3}{2\alpha} = \rho_s \cos(\beta - \theta)\cos(\varphi_2) - \rho_s \sin(\beta - \theta)\sin(\varphi_2) - \rho_s \cos(\beta - \theta)\cos(\varphi_3) + \rho_s \sin(\beta - \theta)\sin(\varphi_3) \quad (9)$$

Collecting terms produces $$\frac{P_1 - P_3}{2\alpha} = \rho_s \cos(\beta - \theta)[\cos(\varphi_1) - \cos(\varphi_3)] - \rho_s \sin(\beta - \theta)[\sin(\varphi_1) - \sin(\varphi_3)] \quad (10)$$

$$\frac{P_2 - P_3}{2\alpha} = \rho_s \cos(\beta - \theta)[\cos(\varphi_2) - \cos(\varphi_3)] - \rho_s \sin(\beta - \theta)[\sin(\varphi_2) - \sin(\varphi_3)] \quad (11)$$

We can rewrite the two equations above in vector notation $$\begin{bmatrix} \left(\frac{P_1 - P_3}{2\alpha}\right) \\ \left(\frac{P_2 - P_3}{2\alpha}\right) \end{bmatrix} = \begin{bmatrix} [\cos(\varphi_1) - \cos(\varphi_3)] & [\sin(\varphi_3) - \sin(\varphi_1)] \\ [\cos(\varphi_2) - \cos(\varphi_3)] & [\sin(\varphi_3) - \sin(\varphi_2)] \end{bmatrix} \begin{bmatrix} \rho_s \cos(\beta - \theta) \\ \rho_s \sin(\beta - \theta) \end{bmatrix} \quad (12)$$

The vector $$\begin{bmatrix} \rho_s \cos(\beta - \theta) \\ \rho_s \sin(\beta - \theta) \end{bmatrix} \quad (13)$$

is the vector in the complex plane of the signal $E_s$ to be reconstructed. We can invert the matrix and multiply both sides of the equation to find this vector.

$$\begin{bmatrix} [\cos(\varphi_1) - \cos(\varphi_3)] & [\sin(\varphi_3) - \sin(\varphi_1)] \\ [\cos(\varphi_2) - \cos(\varphi_3)] & [\sin(\varphi_3) - \sin(\varphi_2)] \end{bmatrix}^{-1} \begin{bmatrix} \left(\frac{P_1 - P_3}{2\alpha}\right) \\ \left(\frac{P_2 - P_3}{2\alpha}\right) \end{bmatrix} = \begin{bmatrix} \rho_s \cos(\beta - \theta) \\ \rho_s \sin(\beta - \theta) \end{bmatrix} \quad (14)$$

For illustrative purposes, assume that the 3×3 coupler is ideal, and, $$\varphi_1 = 0 \quad (15)$$

$$\varphi_2 = \frac{2\pi}{3} \quad (16)$$

$$\varphi_3 = -\frac{2\pi}{3} \quad (17)$$

We can then evaluate the sines and cosines exactly to get, $$\begin{bmatrix} \left[1+\frac{1}{2}\right] & \left[\left(-\frac{\sqrt{3}}{2}\right)-0\right] \\ \left[-\frac{1}{2}-\left(-\frac{1}{2}\right)\right] & \left[\left(-\frac{\sqrt{3}}{2}\right)-\left(\frac{\sqrt{3}}{2}\right)\right] \end{bmatrix}^{-1} \begin{bmatrix} \left(\frac{P_1-P_3}{2\alpha}\right) \\ \left(\frac{P_2-P_3}{2\alpha}\right) \end{bmatrix} = \begin{bmatrix} \rho_s \cos(\beta-\theta) \\ \rho_s \sin(\beta-\theta) \end{bmatrix} \quad (18)$$

and with simplifications, $$\begin{bmatrix} \frac{3}{2} & -\frac{\sqrt{3}}{2} \\ 0 & -\sqrt{3} \end{bmatrix}^{-1} \begin{bmatrix} \left(\frac{P_1-P_3}{2\alpha}\right) \\ \left(\frac{P_2-P_3}{2\alpha}\right) \end{bmatrix} = \begin{bmatrix} \rho_s \cos(\beta-\theta) \\ \rho_s \sin(\beta-\theta) \end{bmatrix} \quad (19)$$

Inverting the matrix gives, $$\begin{bmatrix} \frac{2}{3} & \frac{1}{3} \\ 0 & -\frac{1}{\sqrt{3}} \end{bmatrix} \begin{bmatrix} \left(\frac{P_1-P_3}{2\alpha}\right) \\ \left(\frac{P_2-P_3}{2\alpha}\right) \end{bmatrix} = \begin{bmatrix} \rho_s \cos(\beta-\theta) \\ \rho_s \sin(\beta-\theta) \end{bmatrix} \quad (20)$$

and multiplying through gives, $$\begin{bmatrix} \left(\frac{P_1-P_3}{3\alpha} + \frac{P_2-P_3}{6\alpha}\right) \\ -\frac{1}{\sqrt{3}}\left(\frac{P_2-P_3}{2\alpha}\right) \end{bmatrix} = \begin{bmatrix} \rho_s \cos(\beta-\theta) \\ \rho_s \sin(\beta-\theta) \end{bmatrix} \quad (21)$$

As a result, the desired electric field $E_s$ can be expressed as follows:

$$E_s = \rho_s e^{i(\beta-\theta)} = \rho_s \cos(\beta-\theta) + i\rho_s \sin(\beta-\theta) = \quad (22)$$
$$\left(\frac{P_1-P_3}{3\alpha} + \frac{P_2-P_3}{6\alpha}\right) - i\frac{1}{\sqrt{3}}\left(\frac{P_2-P_3}{2\alpha}\right)$$

$$E_s = \left(\frac{P_1-P_3}{3\alpha} + \frac{P_2-P_3}{6\alpha}\right) - i\frac{1}{\sqrt{3}}\left(\frac{P_2-P_3}{2\alpha}\right) \quad (23)$$

The data processor uses the known reference signal amplitude $\alpha$ and the known detected powers $P_1$-$P_3$ to determine the input optical signal $E_s$.

The first example embodiment assumes that the optical signal to be determined $E_s$ has only one polarization. But as mentioned in the background, optical signals have more than one polarization. If only one polarization state is detected, as described so far, then there is a possibility that the unknown signal could be polarized orthogonally to the detected state. In that situation, no signal would be detected. A more likely case is that the signal will lie somewhere between perfect alignment, (i.e., in the same polarization state), and perfect orthogonality, (i.e., zero detection). The signal will be detected, but not its absolute amplitude (power) because some percentage of the signal will be in the orthogonal state and will go undetected. A further complication occurs if the signal changes polarization as a function of time or frequency. In this case, it will be impossible to detect this polarization change. Instead, the polarization change will be wrongly interpreted as a change in amplitude or phase.

To address these shortcomings and account for the two polarizations of the input light signal, the input optical signal is treated in the second example embodiment as a vector quantity with two orthogonal vector components called first and second phasors. These two phasors fully describe the optical signal to be determined. Each of the first and second phasors is a complex signal having a real part and an imaginary part.

Figure 9A:
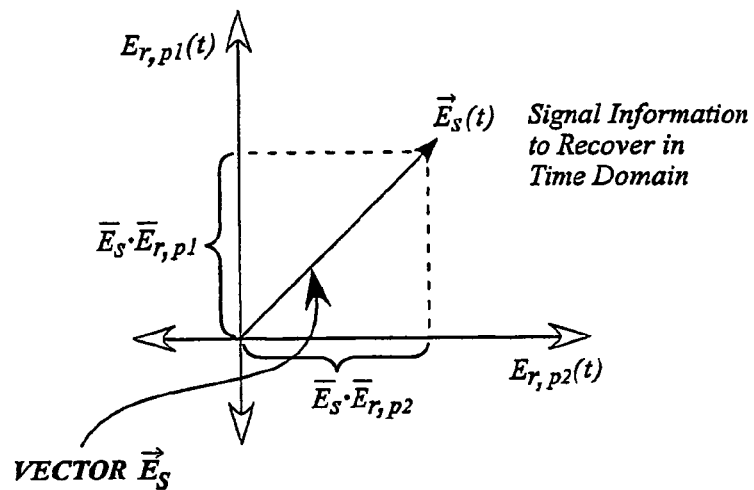
FIGS. 9A-9C illustrate the outputs of detector blocks 1 and 2 shown in FIG. 10.
Figure 9B:
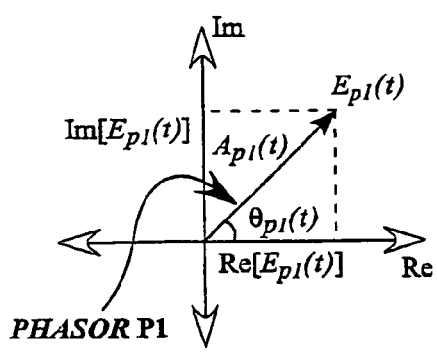
Figure 9C:
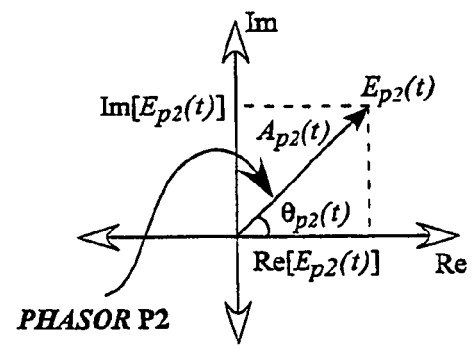

This concept is represented graphically in FIGS. 9A-9C. FIG. 9A shows vector $E_s$ which represents the complex optical signal that to be reconstruct in the time domain for analysis. The vector $E_s$ is measured with respect to two orthogonal polarization planes p1(t) and p2(t) of the reference signal $E_r$. The first polarization plane $E_{r,p1(t)}$ corresponds to the vertical axis in FIG. 9A. The second polarization plane $E_{r,p2(t)}$ corresponds to the horizontal axis in FIG. 9A. The vertical component of $E_s$ corresponds to the dot product of vector $E_s$ and the vertical polarization plane $E_{r,p1}$. In other words, the first phasor is the projection of vector $E_s$ onto the vertical polarization plane $E_{r,p1}$. Similarly, the second phasor is the $E_s$ vector corresponds to the dot product $E_s \cdot E_{r,p2}$ and is the projection of $E_s$ onto the horizontal polarization plane.

The vertical component of vector $E_s$ is the first phasor $P_1$ illustrated in FIG. 9B. Phasor P1 corresponds to the polarization plane $E_{r,p1}$ and has both an amplitude $A_{p1(t)}$ and an angle of direction $\theta_{p1(t)}$. Phasor P1 is a complex number and has both a real component corresponding to the horizontal axis and an imaginary component corresponding to the vertical axis. Similarly, FIG. 9C illustrates the second phasor P2 which corresponds to the horizontal component of the vector $E_s$ in the polarization plane $E_{r,p2}$. It also is a complex number having an amplitude $A_{p2(t)}$ and a phase $\theta_{p1(t)}$ and real and imaginary components.

Figure 10:
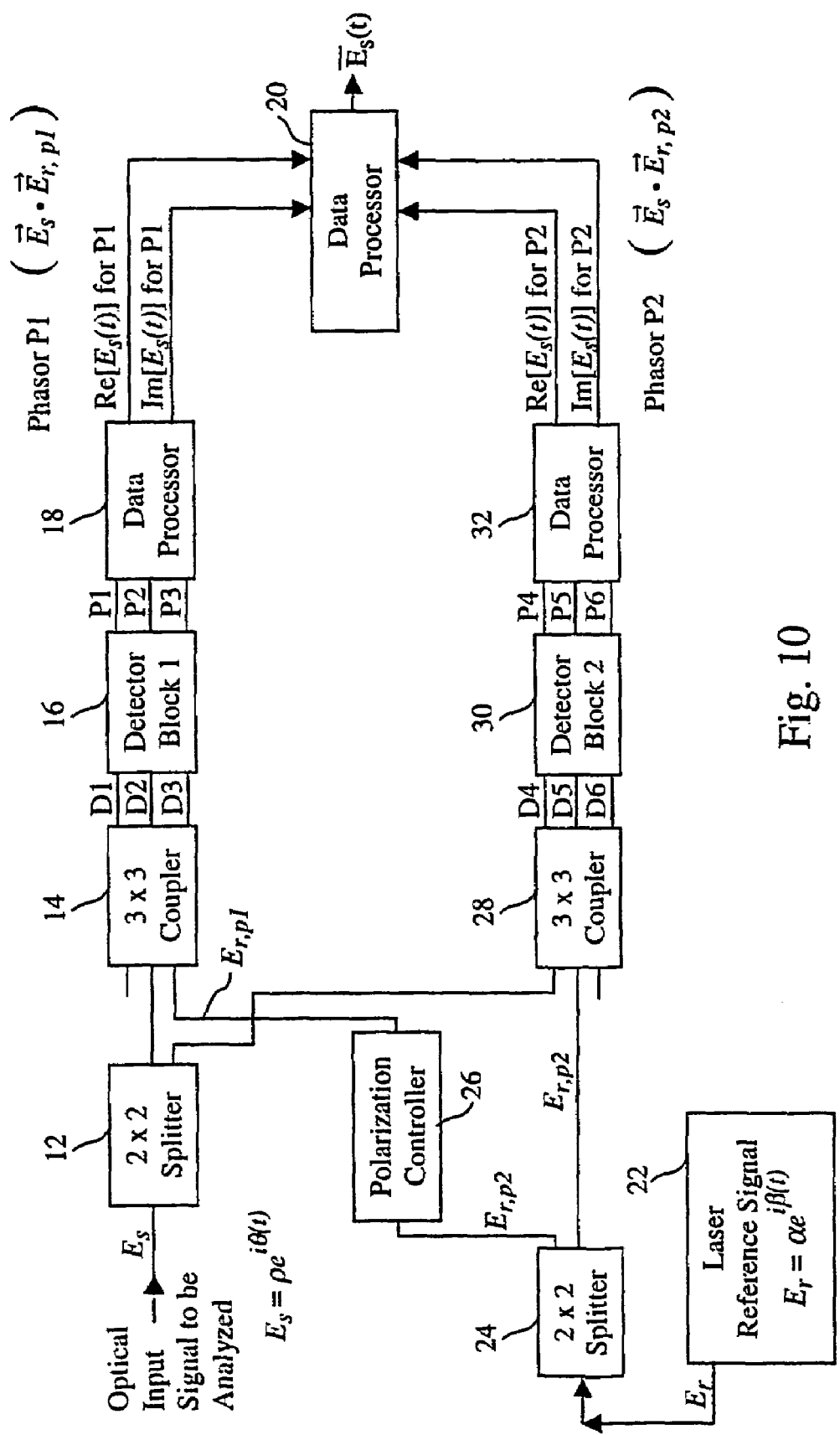
FIG. 10 is a depiction of an HOSA in accordance with a second example embodiment.

In order to account for the two polarization plane components of the vector $E_s$, two detector blocks are employed in a second embodiment of an HOSA shown in FIG. 10. The detector block 16 corresponds to phasor P1 shown in FIG. 9B, and the detector block 30 corresponds to phasor P2 shown in FIG. 9C. The two reference signal polarization planes $E_{r,p1}$ and $E_{r,p2}$ are generated by splitting the laser reference signal $E_r$ in a two-by-two splitter 24. One output of the two-by-two splitter 24 corresponds to the reference signal in an $E_{r,p2}$ polarization which is forwarded to a three-by-three coupler 28. The reference signal in the other output from the two-by-two splitter 24 is provided to a polarization controller 26 which changes the polarization of the reference signal from $E_{r,p2}$ to $E_{r,p1}$ which is approximately orthogonal to polarization $E_{r,p2}$. One non-limiting example of a commercially available polarization controller is the FPC031 from Thorlabs. The reference signal $E_{r,p1}$ is provided as an input to the first three-by-three coupler 14 as described above. The second three-by-three coupler 28 provides three outputs of the mixed signals $E_s$ and $E_r$ at the polarization $E_{r,p2}$ as inputs D4, D5 and D6 to detector block 2 (30). Detector block 2 detects a power signal P4, P5, and P6 corresponding to the detected mixed signals D4, D5 and D6 and provides those detected power signals to a data processor 32.

Data processor 18 processes the three power levels to determine the real and imaginary components of the phasor $P_1$, and data processor 32 determines the real and imaginary components of phasor $P_2$. Recall that the phasor P1 is the projection of the input signal to be determined $E_s$ onto the reference signal $E_r$ in polarization P1, and phasor P2 corresponds to the projection of the signal $E_s$ on the reference signal in polarization P2. The complex numbers corresponding to phasors P1 and P2 are provided to data processor 20 which determines the input signal to be analyzed vector $E_s$ shown in vector form in FIG. 9A. Data processor 18 performs the calculations in equation (24) set forth below; data processor 32 performs the calculations in equation (25) set forth below, and data processor 20 performs the calculations in equation (26) set forth below.

Figure 11:
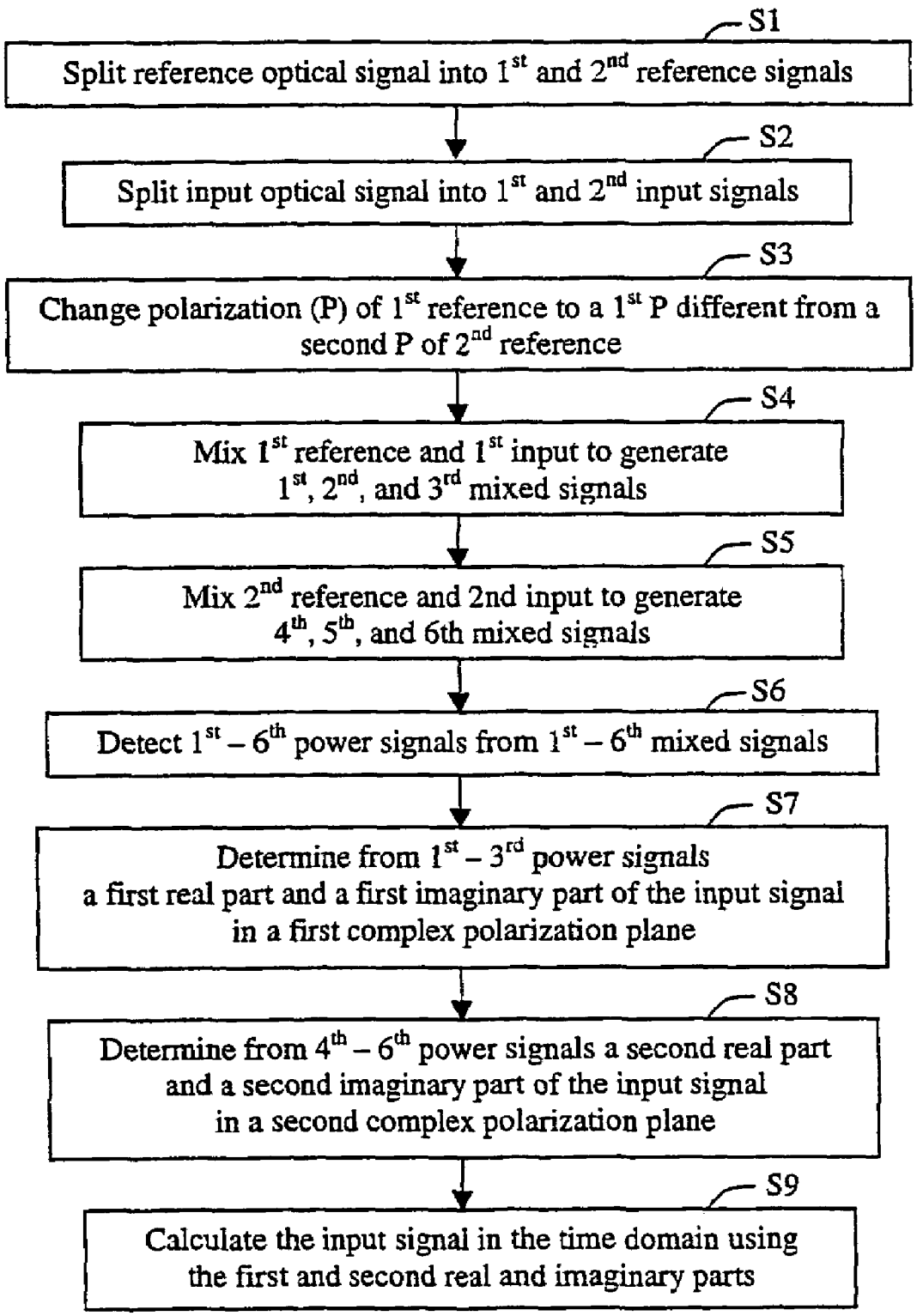
FIG. 11 is a flowchart diagram illustrating example procedures for use with the HOSA shown in the second example embodiment of FIG. 10.

FIG. 11 is a flowchart diagram illustrating example procedures in accordance with the second example embodiment shown in FIG. 10. The optical reference signal is first split into first and second reference signals in splitter 24 (step S1). The input signal is also split into first and second input signals in splitter 12 (step S2). The polarization of the first reference signal from the splitter 24 is changed in polarization controller 26 (step S3). The first reference signal and the first input signal are mixed to generate first, second, and third mixed signals corresponding to D1, D2, and D3 (step S4). The second reference signal and the second input signal are mixed to generate fourth, fifth, and sixth mixed signals corresponding to D4, D5, and D6, respectively, (step S5). Detector blocks 1 and 2 detect first through sixth power signals from the first through mixed signals (step S6).

Data processor 18 determines from the first through third detected power signals a first real part and a first imaginary part of the input signal $E_s$ projected into a first complex polarization plane P1 (step S7). The data processor 32 determines from the fourth through sixth power signals a second real part and a second imaginary part of the input signal $E_s$ in a second complex polarization plane P2 (step S8). Data processor 20 calculates the input signal $E_s$ in the time domain using the first and second real and imaginary parts (step S9).

The mathematical processing performed by data processor 20 is now described. The same procedures may be performed on detector block 2 as described earlier for detector block 1 to obtain the electric field parallel to the other reference signal polarization. We now have two projections of the electric field $E_s$, and thus the electric field vector $\vec{E}_s$, in some arbitrary x, y plane space:

$$E_{sx} = \left(\frac{P_1 - P_3}{3\alpha_{rx}} + \frac{P_2 - P_3}{6\alpha_{rx}}\right) - i\frac{1}{\sqrt{3}}\left(\frac{P_2 - P_3}{2\alpha_{rx}}\right) \quad (24)$$

$$E_{sy} = \left(\frac{P_4 - P_6}{3\alpha_{ry}} + \frac{P_5 - P_6}{6\alpha_{ry}}\right) - i\frac{1}{\sqrt{3}}\left(\frac{P_5 - P_6}{2\alpha_{ry}}\right). \quad (25)$$

The electric field vector may be converted to an orthonormal space by multiplying this vector $E_{sx}E_{sy}$ by some transforming matrix, $\overline{T}$, $$\vec{E}_s = \overline{T}\begin{bmatrix}\left(\frac{P_1 - P_3}{3\alpha_{rx}} + \frac{P_2 - P_3}{6\alpha_{rx}}\right) - i\frac{1}{\sqrt{3}}\left(\frac{P_2 - P_3}{2\alpha_{rx}}\right) \\ \left(\frac{P_4 - P_6}{3\alpha_{ry}} + \frac{P_5 - P_6}{6\alpha_{ry}}\right) - i\frac{1}{\sqrt{3}}\left(\frac{P_5 - P_6}{2\alpha_{ry}}\right)\end{bmatrix} \quad (26)$$

The notation may be simplified by letting the complex phasor measurements be simple dot products and by not doing any normalization in the first step. We start again with, $$\vec{E}_s \cdot \vec{E}_{r,1} = \left(\frac{P_1 - P_3}{3} + \frac{P_2 - P_6}{6}\right) - i\frac{1}{\sqrt{3}}\left(\frac{P_2 - P_3}{2}\right) \quad (27)$$

$$\vec{E}_s \cdot \vec{E}_{r,2} = \left(\frac{P_4 - P_6}{3} + \frac{P_5 - P_6}{6}\right) - i\frac{1}{\sqrt{3}}\left(\frac{P_5 - P_6}{2}\right) \quad (28)$$

where $\vec{E}_{r,1}$, and $\vec{E}_{r,2}$ are the reference fields at detector blocks one and two, respectively. Simplifying these equations further, $$\vec{E}_s \cdot \vec{E}_{r,1} = \frac{1}{6}(2P_1 + P_2 - 3P_3) - i\frac{1}{2\sqrt{3}}(P_2 - P_3) \quad (29)$$

$$\vec{E}_s \cdot \vec{E}_{r,2} = \frac{1}{6}(2P_4 + P_5 - 3P_6) - i\frac{1}{2\sqrt{3}}(P_5 - P_6) \quad (30)$$

allows rewriting the vector as:

$$\vec{E}_s = \overline{T}\begin{bmatrix}(2P_1 + P_2 - 3P_3) - i\sqrt{3}(P_2 - P_3) \\ (2P_4 + P_5 - 3P_6) - i\sqrt{3}(P_5 - P_6)\end{bmatrix} \quad (31)$$

Equation (31) is a full vector representation of the electric field so that power or phase measurements are not polarization-dependent. Also, polarization dependent signal characteristics (such as the effects of polarization mode dispersion) are measurable.

Figure 12:
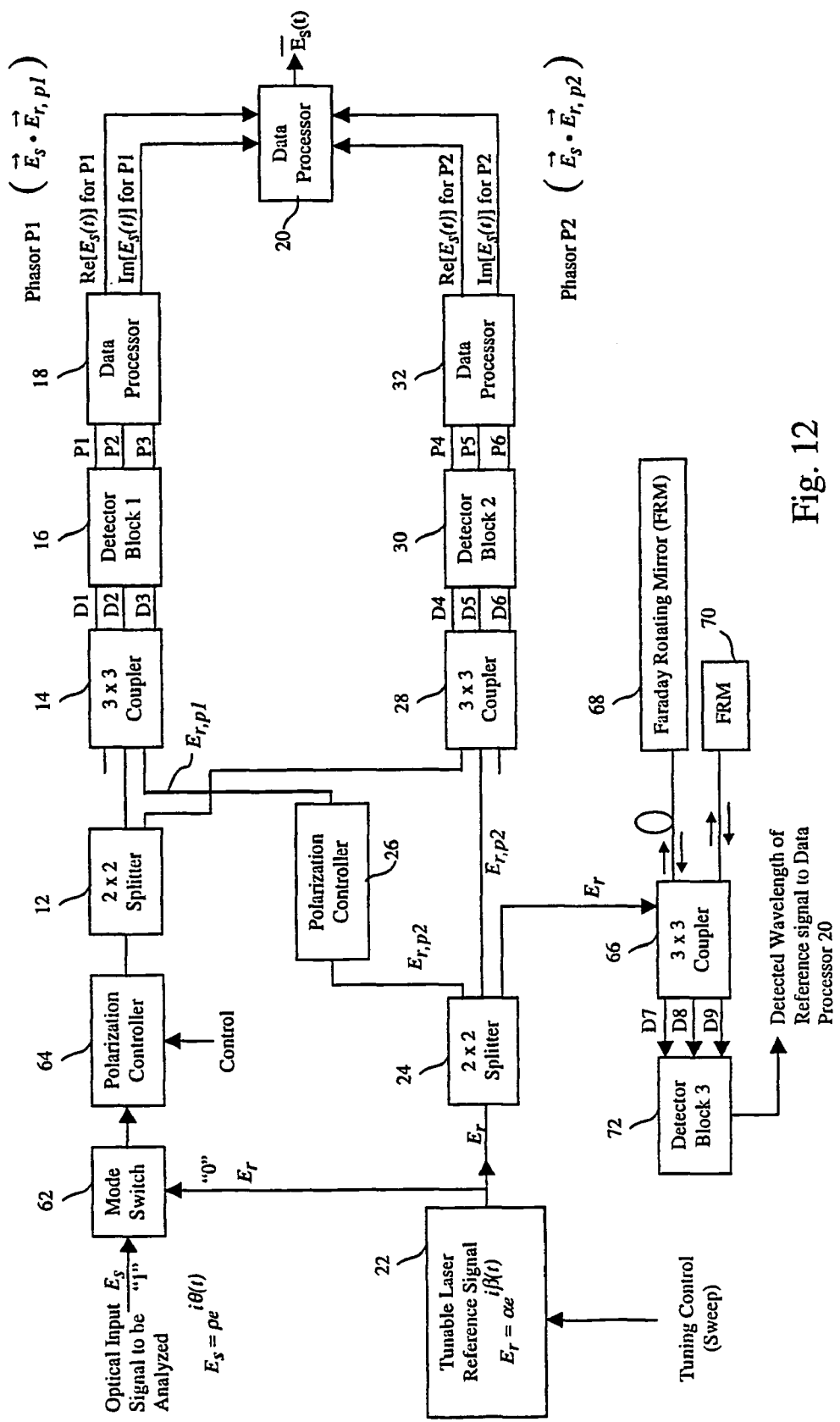
FIG. 12 is a depiction of a HOSA in accordance with a third example embodiment.

A third example HOSA embodiment is depicted in FIG. 12. Various calibration procedures will be described in the context of the HOSA in FIG. 12. However, some of the calibration procedures may be employed with other embodiments. A calibration mode switch 62 coupled to a second polarization controller 64 are inserted between the optical input signal to be analyzed and the two-by-two splitter 12. When the mode switch is set to "1," the input signal $E_s$ is delivered to the polarization controller 64. When the mode switch is set to "0," the reference signal $E_r$ is sent to the polarization controller 64. Also included is structure for calibrating the tunable laser 22 which includes a three-by-three coupler 66 receiving the reference signal from the splitter 24, receiving inputs from two Faraday Rotating Mirrors (FRMs) 68 and 70, and generating outputs detected by a third detector block 72.

A first calibration procedure is the adjustment of polarization controllers 62 and 64. With the mode switch 62 in the "0" position and the reference signal 22 (the output of the tunable laser) in a continuous sweeping mode being incremented through a particular frequency range, such as 1550 nm to 1552 nm, the polarization controller 64 is adjusted to maximize the power levels detected by detector block 30. When this is accomplished, the power level at D5 in detector block 30 is minimized by adjusting polarization controller 26. At that point, polarization controller 64 is adjusted so that the power levels at P2 in detector block 16 and P5 in detector block 30 are approximately the same (within plus or minus 10%). This calibration procedure ensures that the two detected polarization states are not the same and are approximately orthogonal, which leads to better quality measurements.

A next calibration relates to a phasor calibration of detector blocks 1 and 2 (16 and 30). For each three-by-three coupler 14 and 28, the coupling coefficient from any coupler input to any coupler output is equal, and the power detected on each of the outputs should be separated in phase by exactly 120°. In reality, the coupling coefficients between coupler outputs are not the same. Nor is the phase difference between each of the three detector outputs in each detector block exactly 120°. The phasor calibration procedure compensates for these coupling coefficient and phase shift differences.

The phasor calibration begins with a series of measurements aimed at assigning a complex number $z_1 = E_s/E_r$, which will represent the measurement, to detector block 1. After the two polarization controllers are set properly, the mode switch is set to the "0" position. The optical power signal P measured at the $n^{th}$ detector is $$P_n^0 = \alpha^2 r_n^2 + k^2 \alpha^2 m_n^2 + 2k m_n r_n \alpha^2 \cos[\phi(t) - \phi(t-\tau) - \beta_n] \quad (32)$$

where n=1, 2, 3 denoting the three detectors D1, D2, and D3 in Detector Block 16. The amplitude of the reference signal is $\alpha$. The field loss from the laser 22 through the splitter 24, the PC 26, and the coupler 14 to the detector "n" is $r_n$. Since the cosine term (i.e., the AC term) oscillates rapidly as the reference laser is tuned, this term can be extracted from the equation via the following sequence: 1) Fourier transform $P_n^0$, to the time domain, 2) window in the time domain to separate the DC terms from the cosine (AC) term, and 3) transform back to the frequency domain. This sequence 1-3 leaves us the two quantities:

$$[P_n^0]_{DC} = \alpha^2 r_n^2 + k^2 \alpha^2 m_n^2, \quad (33)$$

and $$[P_n^0]_{AC} = 2k\alpha^2 m_n r_n \cos[\phi(t) - \phi(t-\tau) - \beta_n]. \quad (34)$$

The $\beta_n$ terms can be found from Eqs. (35)-(37)

$$\beta_1 = 0, \quad (35), (36), (37)$$

$$\beta_2 = \text{Arg}\left(\frac{[P_2^0]_{AC}}{[P_1^0]_{AC}}\right),$$

$$\beta_3 = \text{Arg}\left(\frac{[P_3^0]_{AC}}{[P_1^0]_{AC}}\right),$$

where, since we are interested only in relative phase, we have chosen to reference $\beta_2$ and $\beta_3$ to $\beta_1$ and set $\beta_1 = 0$. With the mode switch set to the "1" position and with no signal present, we measure $P_n^c$ at each of the n detectors. Then with the measurement signal present, we measure $P_n^m$ at each of the n detectors. These power signals will be of the form $$P_n^c = \alpha^2 r_n^2, \quad (38)$$

and $$P_n^m = \alpha^2 r_n^2 + \rho^2 m_n^2 + 2\alpha\rho m_n r_n \cos[\theta(t) - \phi(t) - \beta_n]. \quad (39)$$

Using the following definitions:

$$P_x = \frac{P_2^m - P_2^c}{[P_2^0]_{DC} - P_2^c} - \frac{P_1^m - P_1^c}{[P_1^0]_{DC} - P_1^c}, \quad (40)\text{–}(45)$$

$$P_y = \frac{P_3^m - P_3^c}{[P_3^0]_{DC} - P_3^c} - \frac{P_1^m - P_1^c}{[P_1^0]_{DC} - P_1^c},$$

$$A = \sqrt{\frac{P_2^c}{[P_2^0]_{DC} - P_2^c}} \cos[\beta_2] - \sqrt{\frac{P_1^c}{[P_1^0]_{DC} - P_1^c}} \cos[\beta_1],$$

$$B = \sqrt{\frac{P_2^c}{[P_2^0]_{DC} - P_2^c}} \sin[\beta_2] - \sqrt{\frac{P_1^c}{[P_1^0]_{DC} - P_1^c}} \sin[\beta_1],$$

$$C = \sqrt{\frac{P_3^c}{[P_3^0]_{DC} - P_3^c}} \cos[\beta_3] - \sqrt{\frac{P_1^c}{[P_1^0]_{DC} - P_1^c}} \cos[\beta_1],$$

$$D = \sqrt{\frac{P_3^c}{[P_3^0]_{DC} - P_3^c}} \sin[\beta_3] - \sqrt{\frac{P_1^c}{[P_1^0]_{DC} - P_1^c}} \sin[\beta_1],$$

we get the linear equation $$\begin{pmatrix} P_x \\ P_y \end{pmatrix} = 2 \begin{pmatrix} A & B \\ C & D \end{pmatrix} \begin{pmatrix} \frac{\rho}{k\alpha}\cos(\theta - \phi) \\ \frac{\rho}{k\alpha}\sin(\theta - \phi) \end{pmatrix}, \quad (46)$$

the solution of which is $$\begin{pmatrix} \frac{\rho}{k\alpha}\cos(\theta - \phi) \\ \frac{\rho}{k\alpha}\sin(\theta - \phi) \end{pmatrix} = \frac{1}{2}\begin{pmatrix} A & B \\ C & D \end{pmatrix}^{-1} \begin{pmatrix} P_x \\ P_y \end{pmatrix}. \quad (47)$$

In order that this solution exists, the matrix $$\begin{pmatrix} A & B \\ C & D \end{pmatrix}$$

must be invertible. Using Eq. (47), along with the expression for $\beta_n$ given in Eqs. (35)-(37), we can assign $$z_1 = \frac{\rho}{k\alpha}[\cos(\theta - \phi) + i\sin(\theta - \phi)],$$

to detector block one. Following the same procedure, we can assign $$z_2 = \frac{\rho}{k\alpha}[\cos(\theta - \phi) + i\sin(\theta - \phi)]$$

to detector block two. The calibration of the two detector blocks can be done simultaneously. Finally, the difference in the relative phase of the complex detectors as a function of the laser frequency must be included in a constant phase term that will be included in the matrix. The phase term will be a linear function of frequency and results from mismatches in the interferometer lengths. We then end up with an uncalibrated vector measurement of, $$\vec{E}_{raw}(t) = \tag{48}$$

$$\frac{1}{k\alpha}\begin{bmatrix} \rho_x(t)e^{i(\theta_x(t)-\phi(t))} \\ \rho_y(t)e^{i(\theta_y(t)-\phi(t)+\gamma_y)} \end{bmatrix} = \frac{e^{-i\phi(t)}}{k\alpha}\begin{bmatrix} \rho_x(t)e^{i(\theta_x(t))} \\ \rho_y(t)e^{i(\theta_y(t)+\gamma_y)} \end{bmatrix} = \begin{bmatrix} z_{1m} \\ z_{2m} \end{bmatrix}$$

These calculations are made in data processors 18 and 35, and the two components are assembled into a vector in data processor 20. The vector calibration matrix described below converts $E_{raw}$ to an accurate representation of the electric field in an ortho-normal basis set. We can then use this measurement in the time-domain reconstruction or other calculations such as simple spectral power or polarization variation as a function of wavelength.

Figure 13:
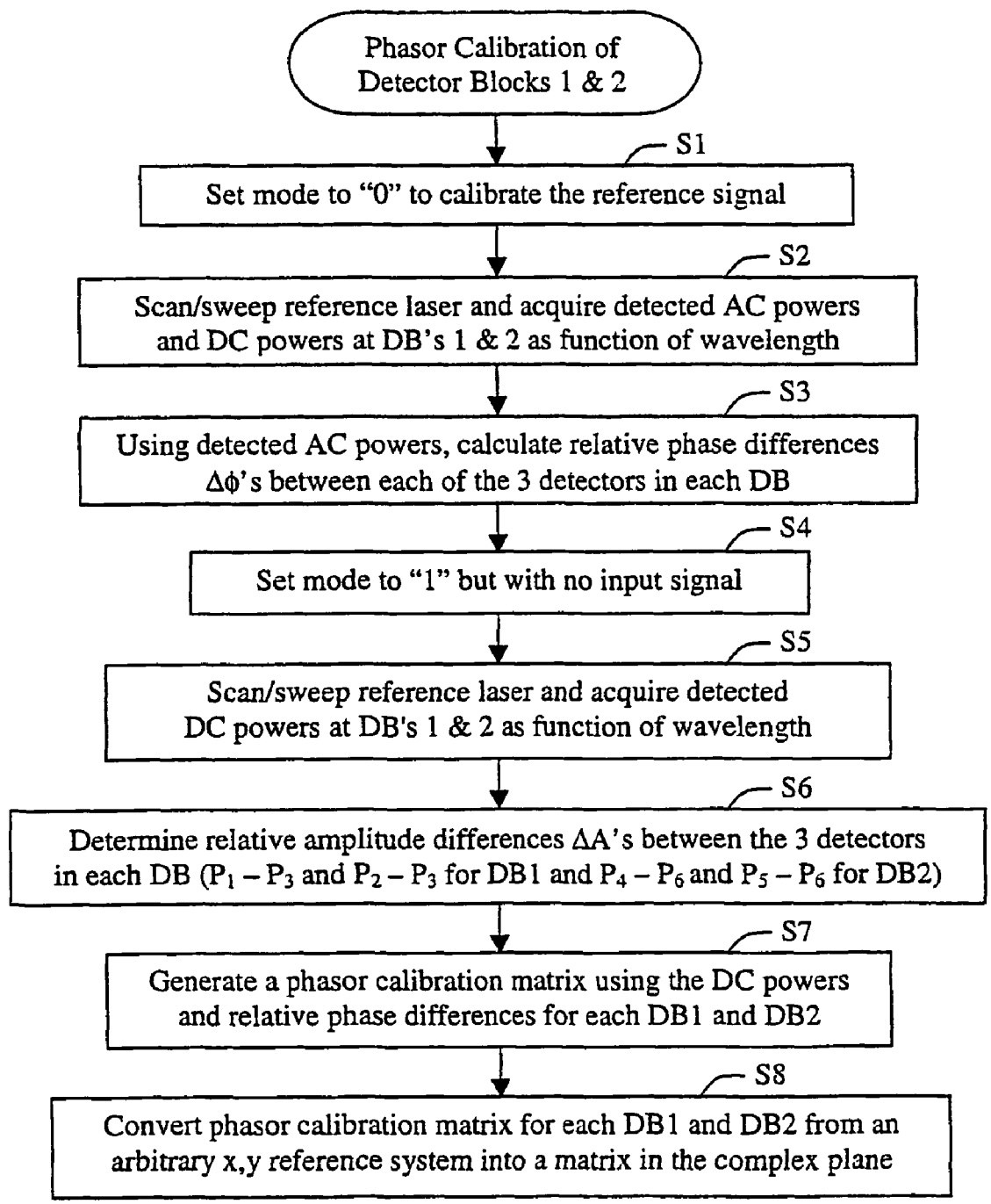
FIG. 13 is a function block diagram illustrating example procedures for phasor calibration of detector blocks 1 and 2.

The phasor calibration of detector blocks 1 and 2 will now be described in more general terms in conjunction with the flowchart diagram depicted in FIG. 13. The mode switch 62 is set to zero to calibrate the reference signal (step S1). The reference laser is swept over a desired frequency range, and at each frequency in the range, powers having both DC and AC components are detected at each of the detector blocks 1 and 2 as a function of wavelength (step S2). Using the detected AC power at each detector block, relative phase differences are calculated between each of the three detectors in each detector block (S3).

The mode switch 62 is set to "1" with no input signal, i.e., there is no signal input into the polarization controller 64 (step S4). The reference laser is swept again over the desired frequency range, and the resulting DC power for each of the detector blocks 1 and 2 is determined for each frequency scan (step S5). Relative amplitude differences between each of the three detectors in each data block are determined, i.e., $P_1$-$P_3$ and $P_2$-$P_3$ for detector block 1, and $P_4$-$P_6$ and $P_5$-$P_6$ for detector block 2 (step S6). A phasor calibration matrix is generated for each of the detector blocks using the DC powers and relative phase differences for each detector block as detected in steps S3 and S6 (step S7). The phasor calibration matrix for each detector block is converted from an arbitrary x, y reference system into an accurate phasor calibration matrix in the complex plane (step S8).

The phasor calibration allows for the correct assignment of a complex number to the electric field incident on the detector block—through the determination of the constants A, B, C, and D—that represents the measured signal to detector blocks one and two. Without this calibration, accuracies better than 10% would be very difficult to achieve. With this calibration, accuracies on the order of 1% should be achievable.

Another desirable calibration is referred to as vector calibration. Vector calibration is designed to make the system insensitive to the polarization of the measured signal. The vector calibration has the further benefit of providing a calibrated measurement of the polarization of the incoming light so that effects like polarization mode dispersion (PMD) can be measured and observed.

The vector calibration begins by setting the mode-switch to the "0" position and taking measurements at detector blocks one and two for four distinct settings of the polarization controller $PC_4$. Using the results of the vector calibration, a complex number can be assigned to both detector block one and two for each of the four measurements. At detector block one, we get $z_{11}$, $z_{12}$, $z_{13}$, $z_{14}$, and at detector block two we get $z_{21}$, $z_{22}$, $z_{23}$, $z_{24}$. With these complex numbers, we form the following vectors:

$$\vec{v}_1 = \begin{pmatrix} z_{11} \\ z_{21} \end{pmatrix}, \vec{v}_2 = \begin{pmatrix} z_{12} \\ z_{22} \end{pmatrix}, \tag{49)-(52}$$

$$\vec{v}_3 = \begin{pmatrix} z_{13} \\ z_{23} \end{pmatrix}, \vec{v}_4 = \begin{pmatrix} z_{14} \\ z_{24} \end{pmatrix},$$

With these definitions, the following matrix can be formed $$\begin{pmatrix} p & g \\ q & h \end{pmatrix} = [\vec{v}_1 \ \vec{v}_2]^{-1}[\vec{v}_3 \ \vec{v}_4], \tag{53}$$

where $[\vec{x} \ \vec{y}]$ is a matrix with columns formed by the elements of the vectors $\vec{x}$ and $\vec{y}$. Using the following set of definitions $$W = |p|^2 + |q|^2 - 1, \tag{54)-(62}$$

$$X = |g|^2 + |h|^2 - 1,$$

$$Y = |pq|,$$

$$Z = |gh|,$$

$$\gamma = \frac{1}{2}\text{Arg}\left(\frac{qg}{ph}\right),$$

$$\Gamma = \text{Arg}\left(\frac{WZ + XY}{\cos\gamma} + i\frac{WZ - XY}{\sin\gamma}\right),$$

$$\Phi = \Gamma - \frac{1}{2}\text{Arg}\left(\frac{qh}{ph}\right),$$

$$\sin\Theta = \frac{-W}{2Y\cos(\text{Arg}[p/q] + \Phi)},$$

$$\cos\Theta = \sqrt{1 - \sin^2\Theta},$$

the vector-calibration matrix is given by $$\hat{M} = \begin{pmatrix} 1 & e^{i\Phi}\sin\Theta \\ 0 & \cos\Theta \end{pmatrix}[\vec{v}_1 \ \vec{v}_2]^{-1}. \tag{63}$$

With the switch in the "1" position, a measurement vector is formed by making a measurement with the signal present and applying the scalar calibration. With the mode switch 62 in position 0, which directs a portion of the tunable laser signal to polarization controller 64 and the subsequent elements, the tunable laser is swept, and a measurement of the signal generated is made. It is presumed that the complex detector blocks 14-18 and 28-32 have been previously calibrated and produce complex numbers representative of the projection of the electric field that went through the measurement path 62, 64, 12, etc. onto the reference electric fields entering each complex detector block, $E_{r,p1}$ and $E_{r,p2}$. These two complex field measurements from the two complex detector blocks are the entries in a vector that characterizes the electric field of the light. This vector field is in an non-orthonormal basis set and must be converted into an orthonormal basis set before accurate measurements can be obtained.

This leaves us with two complex numbers $z_{1m}$ and $z_{2m}$, where, again, the 1 and 2 refer to data taken at detector blocks one and two, and the "m" refers to measurement (as opposed to calibration). The polarization calibrated measurement vector is then given by $$\vec{v}_m = \hat{M}\begin{pmatrix} z_{1m} \\ z_{2m} \end{pmatrix}. \tag{64}$$

This calculation occurs in processor 20, and the accurate vector measurement produced is used to calculate the final measurements of the HOSA. Among these measurements are the time-domain response of the system, the amplitude spectrum, and the polarization state as a function of time or frequency.

Figure 14:
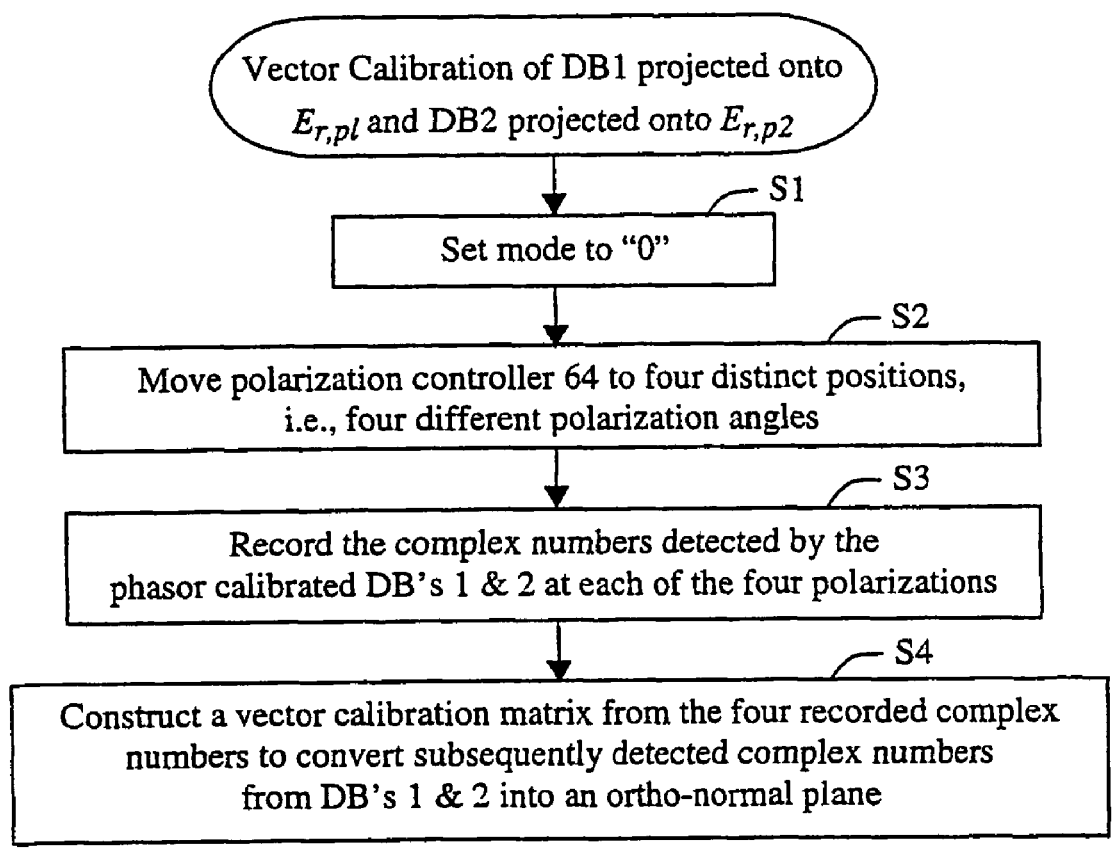
FIG. 14 is a flowchart diagram illustrating example procedures for vector calibration of the output of detector block one projected onto one polarization plane of the reference signal and the output of detector block 2 projected onto another polarization of the reference signal.

A general overview of the vector calibration of detector block 1 (vector projected onto the first polarization plane of the reference signal) and the data block 2 (vector projected on the second polarization plane of the reference signal) is now described in conjunction with the flowchart diagram in FIG. 14. Mode switch 62 is set to "0" so that the reference signal is provided to the polarization controller 64 (step S1). The polarization controller 64 is regulated to four distinct positions by processor 20 that correspond to four different polarization angles (step S2). For each of the four polarizations, the complex numbers detected by the phasor-calibrated detector blocks 1 and 2 are recorded (step S3). A vector calibration matrix is constructed from the four recorded complex numbers to convert subsequently detected complex numbers from the first and second detector blocks onto an ortho-normal plane (step S4). Without this calibration, accuracies better than 10% would be very difficult to achieve. With this calibration, accuracies on the order of 1% should be achievable.

A further desirable calibration of the HOSA is a frequency calibration of the reference laser signal. The measured complex vector representing the input optical signal $E_s$ is an instantaneous measurement in time, and thus, contains little information about the spectrum of input optical signal $E_s$. That spectrum is reconstructed by sweeping the reference signal across the frequency spectrum of the input optical signal $E_s$. Thus, it is important that the reference signal generator/laser be very accurately calibrated.

Figure 15:
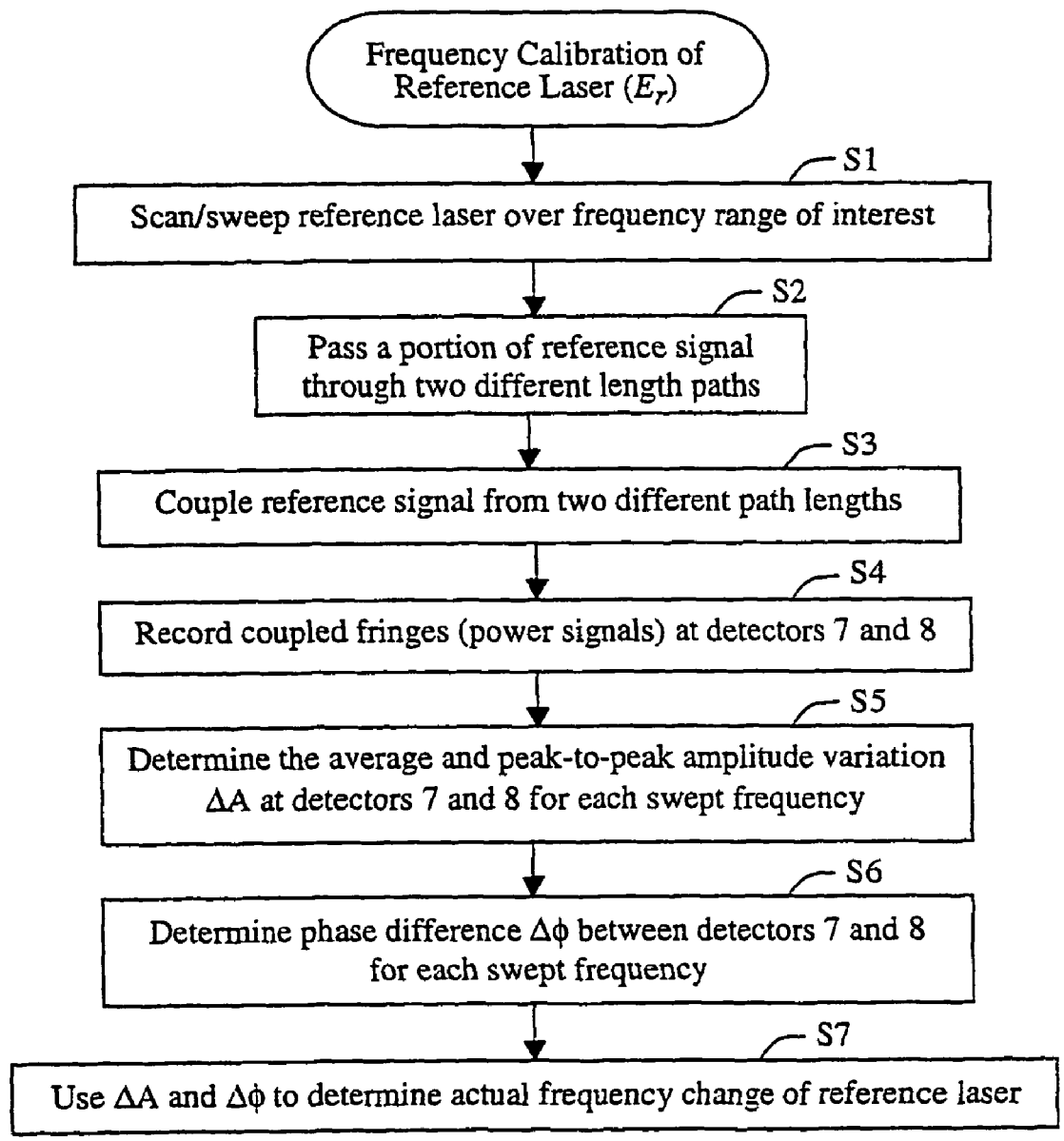
FIG. 15 is a flowchart diagram illustrating example procedures for frequency calibration of the reference laser.

Reference is now made to the frequency calibration of the reference laser $E_r$ flowchart shown in FIG. 15. The reference laser is swept over the frequency range of interest corresponding to the input optical signal (step $S_1$). A portion of the reference signal is passed by way of the three-by-three coupler 66 to each of the Faraday Rotating Mirrors 68 and 70 through different length fiber paths (step $S_2$). The Faraday Rotating Mirror 70 has a longer fiber path than the Faraday Rotating Mirror 70. The reference signal is reflected back by its respective Faraday Rotating Mirror to two inputs of the three-by-three coupler 66. Because of the different fiber lengths, there is a delay between the two reference signals received at the coupler 66 from (step $S_3$). Because of the different fiber lengths, there is a delay when the reference signal is received the coupler 66. The detected power levels on detector inputs $D_7$ and $D_8$ of detector block 3 (72) are recorded (step $S_4$). This occurs for each swept reference laser frequency. The average and peak-to-peak amplitude variations at detectors 7 and 8 are determined (step S5) as well as the phase difference between detectors 7 and 8 for each swept frequency (step S6). The amplitude and phase variations are used to determine the actual frequency output of the reference laser.

The measured phase of the signal $E_s$ is the difference between the phase of the reference $E_r$ and the phase of the input signal $E_s$. The phase of the reference $E_r$ can be obtained from the reference wavelength monitor shown at the bottom of FIG. 12 and consists of a 3×3 coupler 66, two Faraday Rotator Mirrors 68 and 70, and detector block 3 (72). The two signals on detectors D7 and D8 of detector block 3 give the sine and cosine of a phase that is proportional to the frequency of the reference $E_r$. The signal on detector D9 is proportional to the power offset on the sine and cosine signals. This offset power can be subtracted off either electronically or optically. The remaining sine and cosine terms contain a static relative phase error between the signals. This phase error can be corrected for in the following way. There are two power readings, $$P_x = a_x + b_x \cos(\omega\tau) \tag{65}$$

$$P_y = a_y + b_y \cos(\omega\tau + \Omega) \tag{66}$$

where $a_x$ and $a_y$ are the offsets of the fringes on the respective detectors, and $b_x$ and $b_y$ are the respective fringe amplitudes. The phase shift $\Omega$ is the phase difference between the two channels and will be approximately $2\pi/N$, where the coupler is an N×N coupler. We are looking for the angle, $\omega\tau$, which can be found to be, $$\omega\tau = \mathrm{Arg}\left[\frac{P_x - a_x}{b_x} + i\left(\frac{P_x - a_x}{b_x \tan\Omega} - \frac{P_y - a_y}{b_y \sin\Omega}\right)\right]. \tag{67}$$

Once the phase signal proportional to optical frequency has been obtained, it can be integrated to recover the original phase of the reference source. Since the complex numbers $P_x$, $P_y$ have a phase that is relative to the reference $E_r$ phase, division by a complex number having the phase of the reference $E_r$ a number having only the phase as the signal of interest:

$$\phi(t) = \frac{1}{\tau}\int_0^\tau \omega(t')\tau\, dt'. \tag{68}$$

This $\phi(t)$ is the phase of the reference signal, which appears as $\beta$ in the discussions of the detector calibrations above. Given knowledge of the reference phase from equation 67 and a measurement of the signal phase difference from equations (31) or (48), we can calculate the phase of the signal field, $\theta(t)$. Because of the limited bandwidth of detectors D1-D6, the signal is measured over a limited (e.g., ~10 MHz) bandwidth at any given time. The measured signal as a function time is thus only a portion of the overall signal of interest. By sweeping the reference laser over the full range of the signal, all of the signal can be observed. Since the bandwidth of the detectors and the precise frequency of the reference laser are known, the full time-domain signal may be reconstructed analogous to assembling a panoramic view by joining together a set of photographs that slightly overlap.

In this case, however, the signal is varying with time, and the snap shots (continuing with the panorama analogy) must be synchronized. This synchronization is achieved by sampling the signal at an integer multiple of the signal repetition rate. Although the assembling of snap shots is a good heuristic picture of the process, the optimal practice differs substantially. We have the equivalent of a very precise measurement of the camera angle (the reference phase) and fading on the picture edges (the bandwidth limitation on the detectors). In order to properly recover the full panoramic view, we must blend overlapping pictures, weighting each appropriately by the degree of fading on each at any particular pixel.

What follows below is a mathematical description of a process for assembling the overall time signal. The mathematical nature of the description means that it is easy to translate the analysis into a computer algorithm. Thus the description below is easy for the computer to understand, and the description above is easy for the reader to understand. In this regard, the analysis below should be regarded as a particular example solution. Many other solutions may be found. Having a particular solution at hand merely illustrates that there is such a solution, and it can be implemented on a computer.

We begin with our detected and calibrated complex signal, $$z_m(t) = [z_s(t)e^{i\phi(t)}]b(t) \tag{69}$$

here $z_m(t)$ is the measured complex signal at the detector block(s) and $z_s(t)$ is the original input signal that we wish to recover, $\phi(t)$ is the phase of the reference of which we have a measurement, and b(t) is the impulse response of the band-limited detector or block 1 (and block 2?) and is the convolution operator. We can then take a Fourier transform to get, $$\int_{-\infty}^{\infty} z_m(\tau)e^{i\omega\tau} d\tau = B(\omega)\int_{-\infty}^{\infty} z_s(\tau)e^{i\omega\tau + i\phi(t)} d\tau. \tag{70}$$

Invert the transform gives $$\int_{-\infty}^{\infty}\int_{-\infty}^{\infty} z_m(\tau)e^{i\omega\tau} d\tau e^{-i\omega t} d\omega = \tag{71}$$
$$\int_{-\infty}^{\infty} B(\omega)\int_{-\infty}^{\infty} z_s(\tau)e^{i\omega\tau + i\phi(t)} d\tau e^{-i\omega t} d\omega.$$

Collecting terms under a double integral, $$z_m(t) = \int_{-\infty}^{\infty}\int_{-\infty}^{\infty} z_s(\tau)B(\omega)e^{i\phi(t)}e^{-i\omega(t-\tau)} d\tau d\omega, \tag{72}$$

and extract the unknown signal function from the integral over frequency yields $$z_m(t) = \int_{-\infty}^{\infty} z_s(\tau)\int_{-\infty}^{\infty} B(\omega)e^{i\phi(t)}e^{-i\omega(t-\tau)} d\omega d\tau. \tag{73}$$

We can the define a new function of two time variables, forming the Greens function that relates the measured signal to the input signal $$b'(t, \tau) = \int_{-\infty}^{\infty} B(\omega)e^{i\phi(t)}e^{-i\omega(t-\tau)} d\omega. \tag{74}$$

Note that this function is comprised entirely of known or measurable quantities. Substituting back in, we then get $$z_m(t) = \int_{-\infty}^{\infty} z_s(\tau)b'(t, \tau) d\tau. \tag{75}$$

So, the measurement is simply the result of a linear operator on the signal, $z_s(t)$, having a kernel given by $b'(t,\tau)$. If the operator is invertible, then we will be able to reconstruct the signal. If we discretize the process, Eq. (75) becomes $$z_k = z_m(kt) = \sum_{n=0}^{N} z_s(n\tau)b'(kt, n\tau)\Delta\tau. \tag{76}$$

Assigning new names to the discretized functions gives $$z_k = \sum_{n=0}^{N} a_n b'_{kn}\Delta\tau. \tag{77}$$

Rewriting in linear algebra notation:

$$\vec{z} = \overline{b}\vec{a}. \tag{78}$$

If the calculated matrix, $\overline{b}$, is invertible, then the discrete signal, $\vec{a}$, can be recovered by, $$\overline{b}^{-1}\vec{z} = \vec{a} \tag{80}$$

In general, $\overline{b}$ is a very large matrix (~1 million by 1 million), however, in most cases it will be extremely sparse having only 10 to 100 elements centered on the diagonal. This should make the numerical problem tractable.

The recovered vector, $\vec{a}$, is an accurate reconstruction of the electric field as a function of time, and from this signal, any characteristic of the optical spectrum of the original input optical signal can be recovered.

Figure 16:
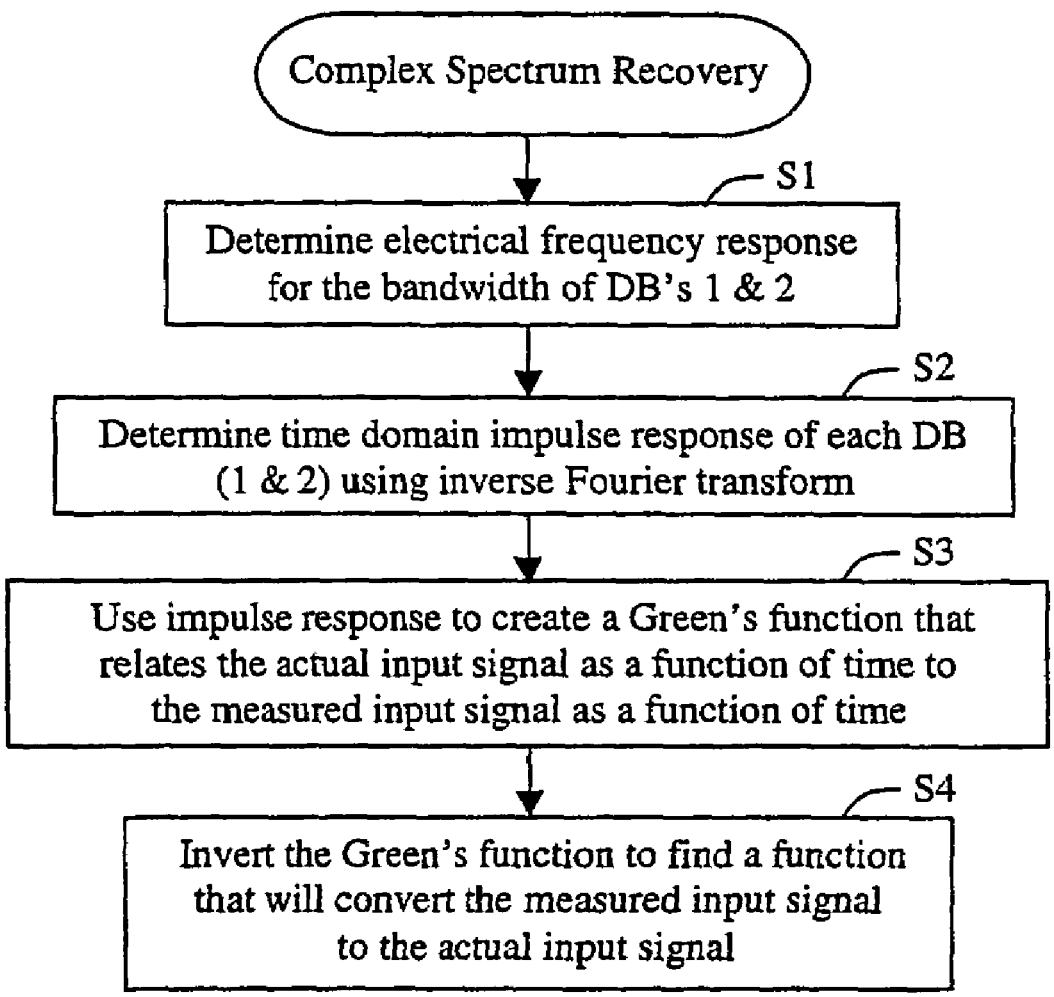
FIG. 16 is a flowchart diagram illustrating example procedures for complex spectrum recovery of the input optical spectrum.

A brief overview of the complex spectrum recovery is now described in conjunction with the flowchart depicted on FIG. 16. The electrical frequency response for the bandwidth of the two detector blocks 1 and 2 is determined (step S1). The time domain impulse response of each detector block is then calculated from its frequency response using the inverse Fourier transform (step S2). The impulse response to create a Greens function that relates the actual input signal as a function of time to the measured input signal as a function of time (step S3). The Greens function is then inverted to find a function that will convert the measured input signal generated by the detector blocks 1 and 2 to the actual input signal (step S4). In the context of the aboveanalogy, this step is the blending of the large set of snap shots that produces the overall view. It is however described in mathematical terms than one skilled in the art of algorithm creation can understand and directly put to use.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the scope of the appended claims.

What is claimed:

1. An optical signal analyzer comprising:
   a first coupler for mixing an optical reference signal and an input optical signal to be determined and generating multiple mixed signals;
   a detector for detecting multiple power signals from the multiple mixed signals generated by the first coupler; and
   a data processor for determining the input optical signal in the time domain from the multiple detected power signals.

2. The optical signal analyzer in claim 1, wherein the data processor is configured to determine an amplitude and a phase of the input optical signal from the detected multiple power signals.

3. The optical signal analyzer in claim 1, wherein
   the first coupler is configured to mix the optical reference signal and the input optical signal to generate first, second, and third mixed signals,
   wherein the detector is configured to detect first, second, and third power signals from the first, second, and third mixed signals, respectively, and
   wherein the data processor is configured to determine the input optical signal in the time domain using the first, second, and third detected power signals.

4. The optical signal analyzer in claim 1, further comprising:
   a second coupler for mixing the reference signal and the input optical signal,
   wherein the detector is configured to detect power signals from the mixed signals generated by the first and second couplers, and
   wherein the data processor is configured to determine the input optical signal in the time domain from the detected power signals.

5. The optical signal analyzer in claim 4, wherein
   the first coupler mixes the optical reference signal and the input optical signal to generate first, second, and third mixed signals,
   the second coupler mixes the reference signal and the input optical signal to generate fourth, fifth, and sixth mixed signals, the optical signal analyzer further comprising:
   a first detector block for detecting first, second, and third power signals from the first, second, and third mixed signals, respectively;
   a second detector block for detecting fourth, fifth, and sixth power signals from the fourth, fifth, and sixth mixed signals, respectively; and
   wherein the data processor is configured to determine the input optical signal in the time domain using the first through sixth detected power signals.

6. The optical signal analyzer in claim 5, wherein the data processor is configured to determine a first phasor of the input optical signal using the first, second, and third detected powers and determine a second phasor of the input optical signal using the fourth, fifth, and sixth detected powers, and
   wherein the data processor is configured to determine the input optical signal in the time domain using the first and second phasors.

7. An optical signal analyzer comprising:
   a first terminal for receiving an input optical signal to be determined;
   a second terminal for receiving a reference optical signal;
   a first splitter for splitting the reference optical signal into first and second reference portions;
   a polarization changer for changing a polarization of the first reference portion to a first polarization state different from a second polarization state of the second reference portion;
   a second splitter for splitting the input optical signal into first and second input optical signal portions;
   a first coupler for mixing the first reference portion and the first input optical signal portion and generating first, second, and third mixed signals;
   a second coupler for mixing the second reference portion and the second input optical signal portion and generating fourth, fifth, and sixth mixed signals;
   a first detector block for detecting first, second, and third power signals from the first, second, and third mixed signals, respectively;
   a second detector block for detecting fourth, fifth, and sixth power signals from the fourth, fifth, and sixth mixed signals, respectively; and
   a data processor for determining the input optical signal using the first through sixth detected power signals.

8. The optical signal analyzer in claim 7, the further comprising:
   first processing circuitry for determining from the first, second, and third detected powers a first real part and a first imaginary part of the input optical signal in a first complex reference plane, and
   second processing circuitry for determining from the fourth, fifth, and sixth detected powers a second real part and a second imaginary part of the input optical signal in a second complex reference plane,
   wherein the data processor is configured to calculate the input optical signal using the first and second real parts and the first and second imaginary parts.

9. The optical signal analyzer in claim 8, wherein the data processing circuitry is configured to reconstruct the input optical signal in the time domain using the calculated real and imaginary parts.

10. The optical signal analyzer in claim 8, wherein the input optical signal is an optical carrier signal modulated with digital information.

11. The optical signal analyzer in claim 8, wherein the first complex reference plane corresponds to the first polarization state and the second complex reference plane corresponds to the second polarization state, and
wherein the first real part and the first imaginary part of the input optical signal correspond to a first phasor and the second real part and the second imaginary part of the input optical signal correspond to a second phasor, the first and second phasors accurately representing all polarization states of the input optical signal.

12. The optical signal analyzer in claim 8, wherein the first through third detected powers permit the first processing circuitry to determine both amplitude and phase of the input optical signal in the first complex reference plane, and
wherein the fourth through sixth detected powers permit the second processing circuitry to determine both amplitude and phase of the input optical signal in the second complex reference plane.

13. The optical signal analyzer in claim 7, wherein the signal detected by each of the first through sixth detectors is at a beat frequency corresponding to a difference in frequency between the input optical signal and the reference optical signal.

14. The optical signal analyzer in claim 7, wherein the first through sixth detected powers provide both amplitude and phase information needed to determine the input optical signal.

15. The optical signal analyzer in claim 7, wherein each of the detectors includes:
a photodetector;
an amplifier for amplifying an output of the photodetector;
an analog to digital converter for converting the amplified output into digital power signal information; and
a buffer for storing the digital power signal information.

16. A method for analyzing an unknown optical signal comprising:
(a) mixing an optical reference signal and an input optical signal to be analyzed to generate multiple mixed signals;
(b) detecting multiple power signals from the mixed signals; and
(c) determining the input optical signal in the time domain from the multiple detected power signals.

17. The method in claim 16, wherein the determining step (c) includes determining an amplitude and a phase of the input optical signal from the detected power signals.

18. The method in claim 16, wherein the mixing step (a) includes mixing the optical reference signal and the input optical signal to generate first, second, and third mixed signals,
wherein the detecting includes detecting first, second, and third power signals from the first, second, and third mixed signals, respectively, and
wherein the determining step (c) includes determining the input optical signal in the time domain using the first, second, and third detected power signals.

19. The method in claim 16, wherein the mixing step (a) includes mixing the optical reference signal and the input optical signal to generate first, second, third, fourth, fifth, and sixth mixed signals,
detecting in a first detector block first, second, and third power signals from the first, second, and third mixed signals, respectively;
detecting in a second detector block fourth, fifth, and sixth power signals from the fourth, fifth, and sixth mixed signals, respectively, and
wherein the determining step (c) includes determining the input optical signal in the time domain using the first through sixth detected power signals.

20. The method in claim 19, wherein the determining step (c) includes determining a first phasor of the input optical signal using the first, second, and third detected powers, determining a second phasor of the input optical signal using the fourth, fifth, and sixth detected powers, and determining the input optical signal in the time domain using the first and second phasors.

21. The method in claim 20, further comprising:
calibrating the first detector block to determine an amplitude correction and a phase correction for each detector in the first detector block, and
calibrating the second detector block to determine an amplitude correction and phase correction for each detector in the second detector block.

22. The method in claim 21, further comprising:
detecting at the calibrated first detector block first powers corresponding to plural polarization states of the reference signal;
detecting at the calibrated second detector block second powers corresponding to plural polarization states of the reference signal; and
using the first and second powers corresponding to the plural polarization states of the reference signal to convert subsequent detected powers from the first and second detector blocks into an ortho-normal complex plane.

23. The method in claim 16, further comprising:
calibrating a tunable laser generating the reference signal to determine a difference between a set frequency of the laser and an actual frequency of the reference signal produced by the laser over a frequency range of interest.

24. The method in claim 19, further comprising:
determining a frequency response for each of the first and second detector blocks;
determining a time domain impulse response for each of the first and second detector blocks from its corresponding frequency response;
generating a Green's function using the time domain responses; and
using the Green's function to transform the detected signals into the input signal.

25. A method for analyzing an optical signal comprising:
receiving an input optical signal to be determined;
receiving a reference optical signal;
splitting the reference optical signal into first and second reference portions;
changing a polarization of the first reference portion to a first polarization state different from a second polarization state of the second reference portion;
splitting the input optical signal into first and second input optical signal portions;
mixing the first reference portion and the first input optical signal portion and generating first, second, and third mixed signals;
mixing the second reference portion and the second input optical signal portion and generating fourth, fifth, and sixth mixed signals;
detecting first, second, and third power signals from the first, second, and third mixed signals, respectively;
detecting fourth, fifth, and sixth power signals from the fourth, fifth, and sixth mixed signals, respectively; and
determining the input optical signal using the first through sixth detected power signals.

26. The method in claim 25, the further comprising:
determining from the first, second, and third detected powers a first real part and a first imaginary part of the input optical signal in a first complex reference plane;
determining from the fourth, fifth, and sixth detected powers a second real part and a second imaginary part of the input optical signal in a second complex reference plane; and
calculating the input optical signal using the first and second real parts and the first and second imaginary parts.

27. The method in claim 26, wherein the calculating includes reconstructing the input optical signal in the time domain using the calculated real and imaginary parts.

28. The method in claim 26, wherein the input optical signal is an optical carrier signal modulated with digital information.

29. The method in claim 26, wherein the first complex reference plane corresponds to the first polarization state and the and the second complex reference plane corresponds to the second polarization state, and
wherein the first real part and the first imaginary part of the input optical signal correspond to a first phasor and the second real part and the second imaginary part of the input optical signal correspond to a second phasor, the first and second phasors accurately representing all polarization states of the input optical signal.

30. The method in claim 26, wherein both amplitude and phase of the input optical signal in the first complex reference plane are determined using the first through third detected powers, and
wherein both amplitude and phase of the input optical signal in the second complex reference plane are determined using the fourth through sixth detected powers.

31. The method in claim 25, wherein each of the first through sixth detected signals is at a beat frequency corresponding to a difference in frequency between the input optical signal and the reference optical signal.

32. The method in claim 25, wherein the first through sixth detected powers provide both amplitude and phase information needed to determine the input optical signal.

33. A method of calibrating for use in an optical signal detector including a reference source, a first coupler for mixing an input optical signal with the reference signal, a first detector block for detecting first, second, and third power signals output from the first coupler, comprising:
determining amplitude and phase corrections for the first detector block, and
generating a calibration matrix for the first detector block using the determined amplitude and phase corrections.

34. The method in claim 33, wherein the determining step further comprises:
sweeping the reference signal across a range of different wavelengths;
acquiring detected powers at the first detector block as a function of wavelength, each detected power having a high frequency component;
calculating phase differences between detectors in the first detector block using the corresponding acquired high frequency components;
sweeping the reference signal across a range of different wavelengths without an input signal;
acquiring detected powers at the first detector block as a function of wavelength, each detected power having a low frequency component; and
calculating amplitude differences between detectors in the first detector block using the corresponding acquired low frequency components,
wherein the calibration matrix for the first detector block is determined using the calculated phase differences and amplitude differences.

35. The method in claim 33, wherein the calibration matrix is generated in an arbitrary reference system, the method further comprising:
converting the calibration matrix from the arbitrary reference system into a complex plane reference system.

36. The method in claim 33, further comprising:
using the calibration matrix to calibrate the first detector block.

37. The method in claim 33, wherein the optical signal detector further includes a second coupler for mixing an input optical signal with the reference signal in a different polarization state and a second detector block for detecting fourth, fifth, and sixth power signals output from the second coupler, comprising:
determining amplitude and phase corrections for each of the first and second detector blocks, and
generating a calibration matrix for each of the first and second detector blocks using the determined amplitude and phase corrections.

38. The method in claim 37, wherein the determining step further comprises:
sweeping the reference signal across a range of different wavelengths;
acquiring detected powers at the first and second detector blocks as a function of wavelength, each detected power having a high frequency component;
in each of the first and second detector blocks, calculating phase differences between detectors;
sweeping the reference signal across a range of different wavelengths without an input signal;
acquiring detected powers at the first and second detector blocks as a function of wavelength, each detected power having a low frequency component; and
in each of the first and second detector blocks, calculating amplitude differences between detectors,
wherein the calibration matrix for each of the first and second detector blocks is determined using the phase differences and amplitude differences calculated for its corresponding detector block.

39. The method in claim 37, wherein each calibration matrix is generated in an arbitrary reference system, the method further comprising:
converting each calibration matrix from the arbitrary reference system into a complex plane reference system.

40. A method of calibrating for use in an optical signal detector including a reference source, a first coupler for mixing an input optical signal with the reference signal in a first polarization state, a second coupler for mixing an input optical signal with the reference signal in a second polarization state, a first detector block for detecting first, second, and third power signals output from the first coupler, a second detector block for detecting fourth, fifth, and sixth power signals output from the second coupler, comprising:
generating the reference signal at different polarizations;
detecting powers at each of the first and second detector blocks to generate a complex vector at each different reference signal polarization; and
generating a vector calibration matrix using the complex vectors generated for each of the reference signal polarizations.

41. The method in claim 40, wherein the reference signal is generated at four different polarizations.

42. The method in claim 40, further comprising:
using the vector calibration matrix to convert subsequently detected powers at the first and second detector blocks into an ortho-normal coordinate system.

43. A method of calibrating for use in an optical signal detector including a reference source, a first coupler for mixing an input optical signal with the reference signal, a first detector block for detecting first, second, and third power signals output from the first coupler, comprising:
sweeping the reference signal across a range of different wavelengths;
passing a portion of the reference signal through two different length paths;
coupling the reference signal from the two different length paths and generating at least two power outputs;
detecting the two power outputs as a function of wavelength; and
determining a frequency correction to be applied to when generating the reference signal using the detected outputs.

44. The method in claim 43, wherein the determining step includes determining an power amplitude difference and a phase difference between the two detectors.

45. The method in claim 43, wherein the determining step further includes determining an average power amplitude variation and a peak-to-peak power amplitude variation.

46. A method for reconstructing an optical signal for use in an optical signal detector including a reference source, a first coupler for mixing an input optical signal with the reference signal in a first polarization state, a second coupler for mixing an input optical signal with the reference signal in a second polarization state, a first detector block for detecting first, second, and third power signals output from the first coupler, a second detector block for detecting fourth, fifth, and sixth power signals output from the second coupler, comprising:
determining a frequency response for a bandwidth of each of the detector blocks, where the bandwidth of the detector blocks is substantially less than the bandwidth of the optical signal;
determining a time domain impulse response of each detector block from its corresponding frequency response;
using the impulse response to create a Green's function that relates the input optical signal as a function of time and a measured signal determined from the detected powers as a function of time.

47. The method in claim 46, further comprising:
inverting the Green's function, and
using the inverted Green's function to convert the measured signal into the optical signal.

* * * * *